United States Patent
Shinzato et al.

(10) Patent No.: US 11,800,226 B2
(45) Date of Patent: Oct. 24, 2023

(54) CONTROL APPARATUS, IMAGE PICKUP APPARATUS, LENS APPARATUS, CONTROL METHOD, AND STORAGE MEDIUM, THAT PROVIDE AN IMAGE-STABILIZATION DRIVING AMOUNT FOR A PREDETERMINED IMAGE POINT POSITION

(71) Applicant: CANON KABUSHIKI KAISHA, Tokyo (JP)

(72) Inventors: Yuki Shinzato, Tochigi (JP); Tomoki Tokita, Tochigi (JP); Tomohiro Ino, Tochigi (JP); Satoshi Maetaki, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/680,963

(22) Filed: Feb. 25, 2022

(65) Prior Publication Data
US 2022/0286615 A1    Sep. 8, 2022

(30) Foreign Application Priority Data
Mar. 3, 2021   (JP) .................................. 2021-033221

(51) Int. Cl.
*H04N 23/68*   (2023.01)
*G02B 27/64*   (2006.01)
*H04N 23/55*   (2023.01)

(52) U.S. Cl.
CPC ......... *H04N 23/687* (2023.01); *G02B 27/646* (2013.01); *H04N 23/55* (2023.01); *H04N 23/683* (2023.01)

(58) Field of Classification Search
CPC .... H04N 23/687; H04N 23/55; H04N 23/683; H04N 23/6842; H04N 23/663; H04N 23/6812; G02B 27/646
See application file for complete search history.

(56) References Cited

U.S. PATENT DOCUMENTS

| | | |
|---|---|---|
| 2005/0157181 A1 | 7/2005 | Kawahara |
| 2011/0001858 A1 | 1/2011 | Shintani |

(Continued)

FOREIGN PATENT DOCUMENTS

| | | | |
|---|---|---|---|
| JP | 2018173632 A | 11/2018 | |
| WO | WO-2020195232 A1 * | 10/2020 | ......... H04N 5/23258 |

OTHER PUBLICATIONS

Extended European Search Report issued in European Appln. No. 22158954.2 dated Jul. 28, 2022.

*Primary Examiner* — Padma Haliyur
(74) *Attorney, Agent, or Firm* — ROSSI, KIMMS & McDOWELL LLP

(57) ABSTRACT

A control apparatus includes at least one processor or circuit configured to execute a plurality of tasks including a first acquiring task configured to acquire information on an image shift sensitivity to a tilt of an imaging optical system corresponding to an image point position of the imaging optical system, which information includes an influence of a distortion of the imaging optical system, and a second acquiring task configured to acquire an image-stabilization driving amount that is used for an image stabilization by an image stabilizer configured to provide the image stabilization. The second acquiring task acquires the image-stabilization driving amount corresponding to a predetermined image point position using the information on the image shift sensitivity corresponding to the predetermined image point position.

20 Claims, 13 Drawing Sheets

(56) References Cited

U.S. PATENT DOCUMENTS

| | | | |
|---|---|---|---|
| 2013/0004151 A1* | 1/2013 | Wakamatsu | G02B 27/646 396/55 |
| 2014/0111659 A1* | 4/2014 | Miyasako | H04N 23/6812 348/208.1 |
| 2015/0326785 A1* | 11/2015 | Tsubaki | H04N 23/6815 348/208.2 |
| 2020/0260010 A1 | 8/2020 | Nakajima et al. | |
| 2021/0092296 A1* | 3/2021 | Kuribayashi | G03B 5/00 |
| 2022/0174216 A1* | 6/2022 | Ozone | H04N 23/6812 |

* cited by examiner

IMAGE POINT POSITION

CORRECTION COEFFICIENT TABLE

PRIOR ART

STARTING POINT OF ARROW:
  IMAGE POINT POSITION OF STATIONARY OBJECT IMAGE
END POINT OF ARROW:
  IMAGE POINT POSITION OF ROTATIONALLY BLURRED OBJECT IMAGE

STARTING POINT OF ARROW:
  IMAGE POINT POSITION OF STATIONARY OBJECT IMAGE
END POINT OF ARROW:
  IMAGE POINT POSITION OF STABILIZED OBJECT IMAGE

CONTROL APPARATUS, IMAGE PICKUP APPARATUS, LENS APPARATUS, CONTROL METHOD, AND STORAGE MEDIUM, THAT PROVIDE AN IMAGE-STABILIZATION DRIVING AMOUNT FOR A PREDETERMINED IMAGE POINT POSITION

BACKGROUND OF THE INVENTION

Field of the Invention

The present invention relates to a control apparatus, an image pickup apparatus, a lens apparatus, a control method, and a program (or storage medium).

Description of the Related Art

In a central projection type optical system, an image point movement on an imaging plane under camera shakes differs between a central part of an image (image center) and a periphery of the image (image periphery). As illustrated in FIG. 18A, an image-point moving amount in the image periphery is larger than that at the image center, and thus the image points in the image periphery remain more significantly moved than those of the image center, as illustrated in FIG. 18B, after the image stabilization. Japanese Patent Laid-Open No. ("JP") 2018-173632 discloses an image pickup apparatus that provides an image stabilization at an image point position in the image periphery based on a difference between an image blur amount at the image center and an image blur amount at a predetermined image point position caused by the central projection method.

The image pickup apparatus disclosed in JP 2018-173632 calculates a correction amount for the image stabilization at the predetermined image point position using an image height dependent expression in an ideal optical system without considering the aberration of the central projection method. Thus, if the image stabilization is performed based on the correction amount calculated by the above expression for an actual optical system having a distortion residue, a correction residue or overcorrection occurs. Moreover, as illustrated in FIG. 18B, at an image point position having an image-point moving direction that has a skew relationship with an image-point moving direction at the image center, the image point moves with a vector different from that of the image center and it is thus difficult to properly calculate the correction amount at that image point position only by the above expression.

JP 2018-173632 further discloses a method of more properly providing an image stabilization by adding design value information on a distortion of an optical system stored in a memory to the calculated correction amount, but this method complicates a calculation process. Furthermore, it also remains difficult to calculate the correction amount at the image point position with the image-point moving direction that has the skew relationship with the image-point moving direction at the image center.

SUMMARY OF THE INVENTION

The present invention provides a control apparatus, an image pickup apparatus, a lens apparatus, a control method, and a storage medium, each of which can easily and satisfactorily provide an image stabilization at a predetermined image point position including a center of an optical axis.

A control apparatus according to one aspect of the present invention includes at least one processor or circuit configured to execute a plurality of tasks including a first acquiring task configured to acquire information on an image shift sensitivity to a tilt of an imaging optical system corresponding to an image point position of the imaging optical system, which information includes an influence of a distortion of the imaging optical system, and a second acquiring task configured to acquire an image-stabilization driving amount that is used for an image stabilization by an image stabilizer configured to provide the image stabilization. The second acquiring task acquires the image-stabilization driving amount corresponding to a predetermined image point position using the information on the image shift sensitivity corresponding to the predetermined image point position.

An image pickup apparatus and a lens apparatus each include the above control apparatus also constitute another aspect of the present invention. A control method corresponding to the above control apparatus and a storage medium storing a program that causes a computer to execute the control method also constitute another aspect of the present invention.

Further features of the present invention will become apparent from the following description of exemplary embodiments with reference to the attached drawings.

DESCRIPTION OF THE EMBODIMENTS

Figure 1:
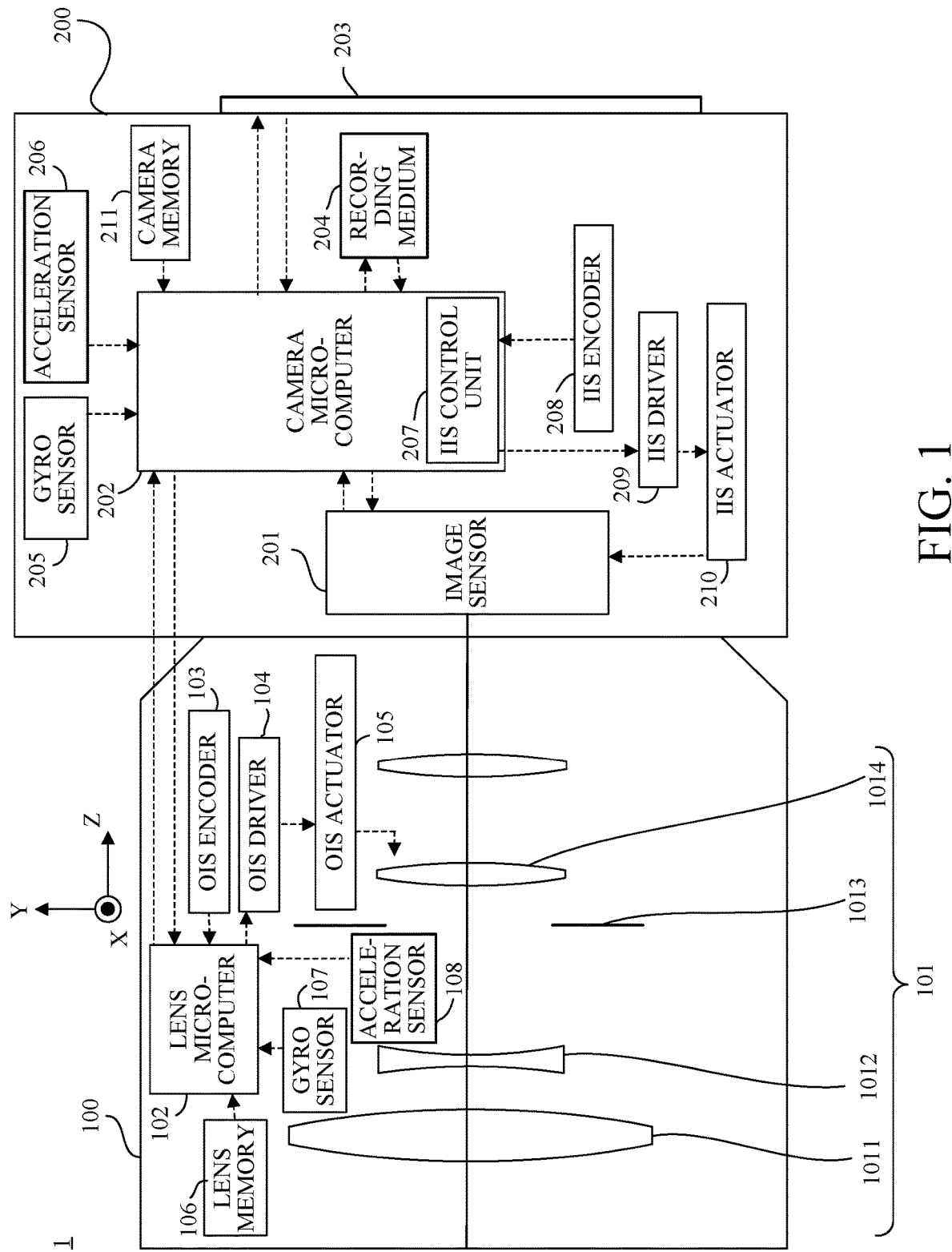
FIG. 1 is a schematic configuration diagram of an image pickup system according to a first embodiment.

Referring now to the accompanying drawings, a detailed description will be given of embodiments according to the present invention. Corresponding elements in respective figures will be designated by the same reference numerals, and a duplicate description thereof will be omitted.

In the following description, in a three-dimensional orthogonal coordinate system (X-axis direction, Y-axis direction, and Z-axis direction), the X-axis direction is a long side direction of the imaging plane, the Y-axis direction is a short side direction of the imaging plane, and the Z-axis direction is an optical axis direction of the optical system.

First Embodiment

FIG. 1 is a schematic configuration diagram of an image pickup system 1 according to this embodiment. The image pickup system 1 includes a lens apparatus 100 and an image pickup apparatus 200. The lens apparatus 100 includes an imaging optical system 101, a lens microcomputer 102, a lens shift type image stabilization (referred to as OIS hereinafter) encoder 103, an OIS driver 104, an OIS actuator 105, and a lens memory (storage unit) 106. The image pickup apparatus 200 includes an image sensor (image pickup element) 201, a camera microcomputer 202, a display/operation unit 203, and a recording medium 204. The image pickup apparatus 200 further includes a gyro sensor 205, an acceleration sensor 206, an image-sensor shift type image stabilization (referred to as IIS hereinafter) encoder 208, an IIS driver 209, an IIS actuator 210, and a camera memory (storage means) 211. IIS is an image stabilization (IS) performed by moving the image sensor 201. The lens microcomputer 102 and the camera microcomputer 202 may be configured as a control apparatus separate from the lens apparatus 100 and the image pickup apparatus 200, respectively.

The imaging optical system 101 includes a focus optical system 1011, a magnification varying (zoom) optical system 1012, a diaphragm (aperture stop) 1013, and an OIS optical system 1014. The imaging optical system 101 forms an object image on an imaging plane of the image sensor 201 using light from the object at an in-focus position within a set angle of view. The focus optical system 1011 provides focusing. The magnification varying optical system 1012 provides a magnification variation (zooming) in order to change an imaging angle of view. The diaphragm 1013 adjusts a light amount captured from the object. The OIS optical system 1014 provides the image stabilization to an image blur that occurs during still or motion image capturing by decentering itself from the optical axis of the imaging optical system 101. Here, OIS is an image stabilization performed by moving the OIS optical system 1014.

The lens microcomputer 102 controls the OIS optical system 1014. More specifically, the lens microcomputer 102 determines an OIS driving amount of the OIS actuator 105 using an image-stabilization (IS) driving amount from the camera microcomputer 202 and a position signal from the OIS encoder 103 that detects the position of the OIS optical system 1014. The OIS driving amount is determined so as not to exceed a movable range of the OIS actuator 105. When the OIS actuator 105 receives an OIS driving amount signal from the OIS driver 104, the OIS actuator 105 moves the OIS optical system 1014 in a direction including a component of a direction orthogonal to the Z-axis direction to decenter it from the optical axis of the imaging optical system 101 and thereby provides the image stabilization. That is, the OIS actuator 105 functions as one of the image stabilizers that provide image stabilization.

The lens memory 106 stores optical design information on the imaging optical system 101. The optical design information includes information on a tilt-image shift sensitivity of the imaging optical system 101 for each image height (information on an image shift sensitivity to a tilt of the imaging optical system 101 according to an image point position of the imaging optical system 101). The information on the tilt-image shift sensitivity is information obtained by using the designed value of the imaging optical system 101 and includes the influence of the distortion of the imaging optical system 101. Use of the information on the tilt-image shift sensitivity can provide a satisfactory image stabilization at a predetermined image point position of the imaging optical system 101, when the image pickup system 1 generates a rotation blur so that the X-Y plane orthogonal to the optical axis is tilted to the optical axis. The camera memory 211 may store the optical design information on the imaging optical system 101 including information on the tilt-image shift sensitivity. Both the lens memory 106 and the camera memory 211 may store the optical design information on the imaging optical system 101 including the information on the tilt-image shift sensitivity.

The imaging optical system 101 has a distortion DIST(h) expressed by the following expression:

$$DIST(h) = (h - h0)/h0$$

$$h0 = f \tan \omega$$

where f is a focal length of the imaging optical system 101, and ω is a half angle of view, h is a distance (real image height) from the optical axis of the imaging optical system 101 to a position on the image plane where a principal ray having the half angle of view ω incident from the object plane is imaged, and h0 is an ideal image height of the central projection method.

Having a distortion means that a distortion amount at any image height within the imaging range is not zero. The imaging optical system having the distortion includes an imaging optical system having a magnification varying function and a focusing function and having distortion in a certain magnification varying state or in-focus state.

The image sensor 201 includes a CCD (Charge Coupled Device) image sensor, a CMOS (Complementary Metal Oxide Semiconductor) image sensor, or another image sensor. The image sensor 201 converts an object image formed on the imaging plane of the image sensor 201 by the imaging optical system 101 into an electric signal, and outputs it as an image signal. The image signal as an analog signal is converted into a digital signal by an unillustrated A/D converter and then output.

The camera microcomputer 202 controls the entire image pickup system 1. For example, the camera microcomputer 202 reads out the image signal as image data from the image sensor 201. The camera microcomputer 202 performs processing such as image processing for the image data based on the optical design information, displaying the image data on the display/operation unit 203, and saving the image data in the recording medium 204. The camera microcomputer 202 issues instructions, such as focusing, zoom magnification changing, and diaphragm adjusting of the imaging optical system 101, to the lens microcomputer 102. Some of the settings relating to the processing may be changed by an operation unit such as a display/operation unit 203 and an unillustrated button.

Figure 2:
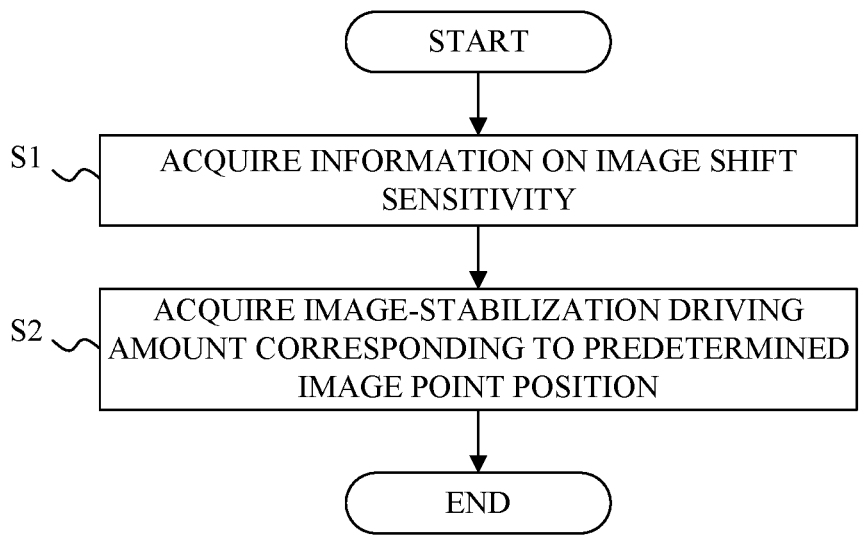
FIG. 2 is a flowchart showing a control method for acquiring an image-stabilization driving amount according to the first embodiment.

The camera microcomputer 202 acquires the IS driving amount (image-stabilization driving amount that is used for the image stabilization by the image stabilizer) according to a flow of FIG. 2. FIG. 2 is a flowchart illustrating a control method for acquiring an IS driving amount by the camera microcomputer 202. In the first acquiring step S1, the camera microcomputer 202 functions as the first acquiring task and acquires the information on the image shift sensitivity to the tilt of the imaging optical system 101 according to the image point position of the imaging optical system 101, which information includes the influence of the distortion of the imaging optical system 101. In the second acquiring step S2, the camera microcomputer 202 functions as a second acquiring task, and acquires an IS driving amount according to a predetermined image point position using the information on the image shift sensitivity according to the predetermined image point position. The camera microcomputer 202 may calculate the IS driving amount, or may acquire it from a table stored in a server, memory, or the like. In this embodiment, the camera microcomputer 202 functions as the first acquiring task and the second acquiring task, but the lens microcomputer 102 may function as the first acquiring task and the second acquiring task.

The gyro sensor 205 outputs information on an angular velocity of the image pickup system 1 as a motion detecting signal. The acceleration sensor 206 outputs information on a moving amount of the image pickup system 1 in a translational direction as a motion detecting signal. The camera microcomputer 202 when receiving the motion detecting signal transmitted from each sensor, transmits the IS driving amount to the lens microcomputer 102 or the IIS control unit 207 in the camera microcomputer 202 so as to provide the image stabilization to an object image for a motion of the image pickup system 1. In the image stabilization, either OIS or IIS may be performed, or both OIS and IIS may be performed with a determined share of image stabilization (such as 50% of OIS and 50% of IIS).

The IIS control unit 207 controls the image sensor 201. More specifically, the IIS control unit 207 determines the IIS driving amount of the IIS actuator 210 using the IS driving amount from the camera microcomputer 202 and the position signal from the IIS encoder 208 that detects the position of the image sensor 201. The IIS driving amount is determined so as not to exceed the movable range of the IIS actuator 210. When the IIS actuator 210 receives the IIS driving amount signal from the IIS driver 209, it moves the image sensor 201 in a direction including a component of a direction perpendicular to the Z-axis direction to decenter it from the optical axis of the imaging optical system 101 and provides the image stabilization. That is, the IIS actuator 210 functions as one of the image stabilizers that provide the image stabilization.

The lens apparatus 100 may include a gyro sensor 107 and an acceleration sensor 108. In this case, in the OIS, the lens microcomputer 102 determines the OIS driving amount using the IS driving amount acquired using the motion detecting signals output from these sensors and the position signal from the OIS encoder 103.

A description will now be given of processing during the image stabilization at a predetermined image point position. When the gyro sensor 205 or the acceleration sensor 206 detects a motion of the image pickup system 1, each sensor outputs the motion detecting signal (information on a blur) to the camera microcomputer 202. The camera microcomputer 202 acquires the IS driving amount using the information on the tilt-image shift sensitivity stored by the lens memory 106, IS position information on the imaging plane, and the motion detecting signals. The camera microcomputer 202 transmits the acquired IS driving amount to the lens microcomputer 102 or the IIS control unit 207.

Acquisition of Information on Tilt-Image Shift Sensitivity

Figure 3:
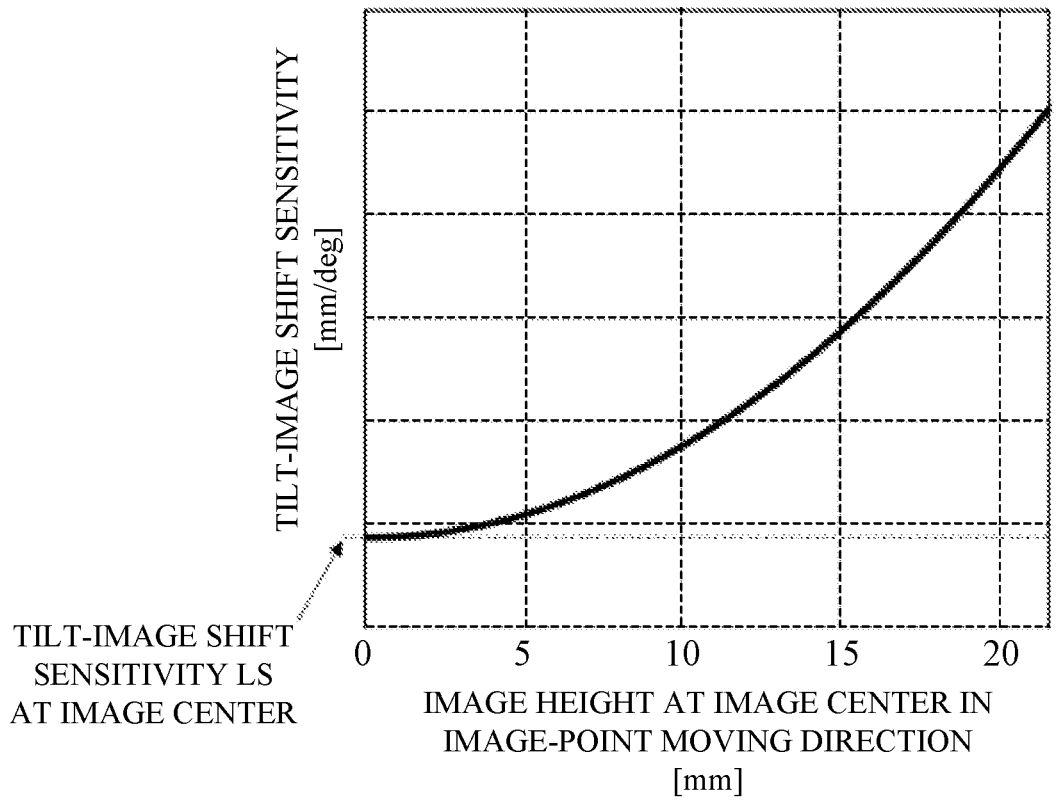
FIG. 3 illustrates a relationship between an image height in an image-point moving direction at an image center and a tilt-image shift sensitivity when the imaging optical system according to the first embodiment is tilted.

In this embodiment, the tilt-image shift sensitivity is an image-point moving amount in a direction orthogonal to a predetermined rotation axis when the imaging optical system 101 is tilted to that rotation axis orthogonal to the optical axis of the imaging optical system 101 on the imaging plane. FIG. 3 illustrates a relationship between the image height in the image-point moving direction at the image center and the tilt-image shift sensitivity (image-point moving amount) when the imaging optical system 101 according to this embodiment is tilted. As illustrated in FIG. 3, as the image height increases, the image-point moving amount increases when the imaging optical system 101 is tilted, which is designed to optically correct the aberration by the central projection method. This embodiment can acquire the image-point moving amount for each image height when rotation blur occurs without performing calculation processing using the image height expression based on the projection method and the distortion amount, because this embodiment utilizes the tilt-image shift sensitivity acquired by using the designed value of the imaging optical system 101. The tilt-image shift sensitivity according to this embodiment is a value obtained by dividing by 0.5° the image-point moving amount when the imaging optical system 101 is tilted by 0.5° relative to the predetermined rotation axis. The tilt angle of the imaging optical system 101 is not limited to 0.5° and may be properly set.

Figure 4:
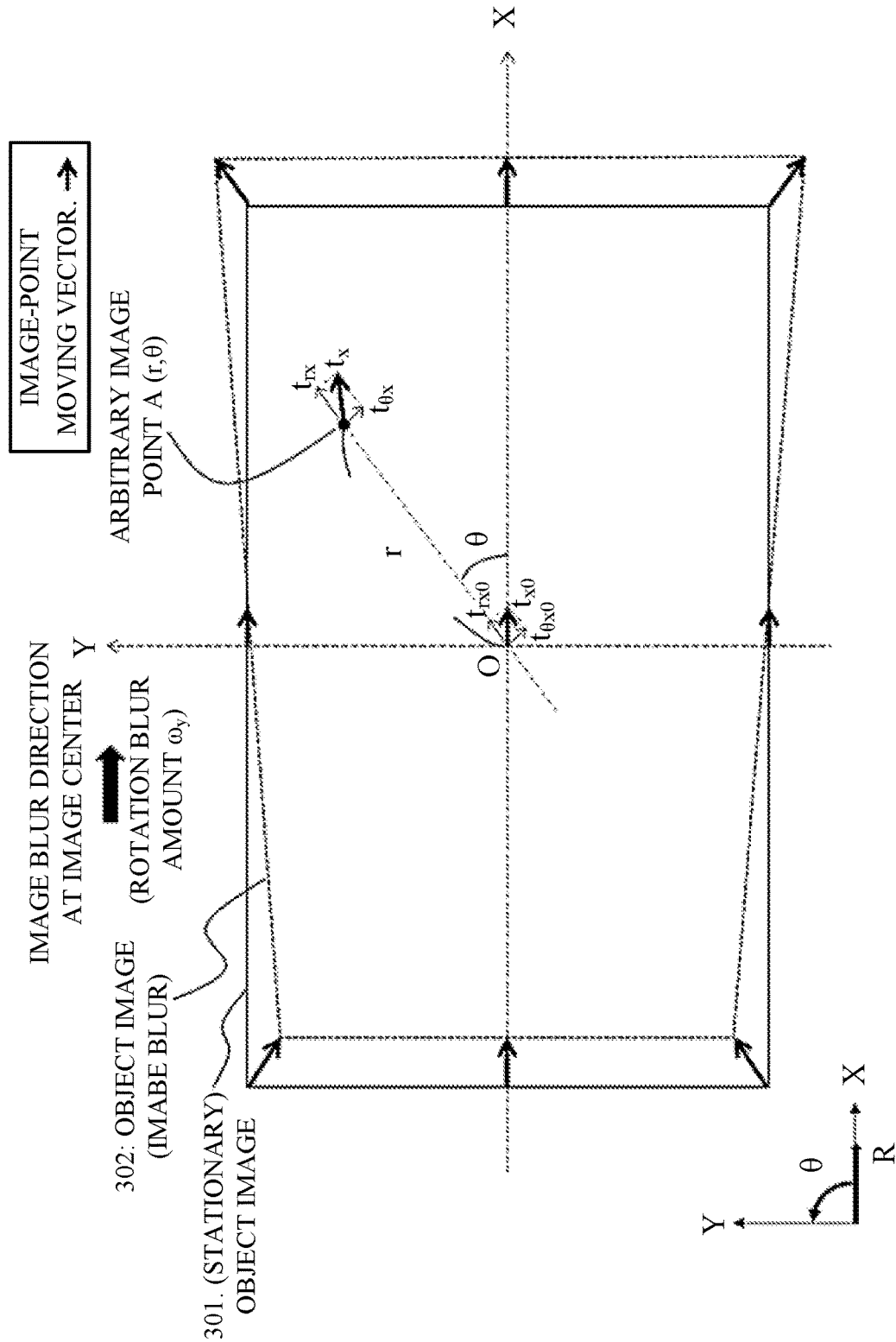
FIG. 4 explains an image point movement at a predetermined image point position against an image point movement at the image center when a rotation blur occurs about a Y-axis in the first embodiment.

FIG. 4 explains an image point movement at a predetermined image point position against an image point movement at an image center when the rotation blur occurs about the Y-axis, and schematically illustrates a state where a stationary (nonblurred) object image 301 is turned into an object image 302 distorted into a trapezoidal shape due to the image blur. In a wide-angle lens that optically corrects the distortion by the central projection method, the trapezoidal distortion like the object image 302 deteriorates when the rotation blur occurs. The image blur occurs when each image point on the imaging plane moves according to an image-point moving vector indicated by an arrow.

A description will now be given of an image-point moving amount $t_{x0}$ in the +X-axis direction at a center position O on the imaging plane, which is the image center when a rotation blur amount $\omega_y$ about the Y-axis occurs, and an image-point moving amount $t_x$ at a predetermined image point position A.

The image-point moving amount $t_{x0}$ is expressed by the following expression (1):

$$t_{x0} = \omega_y \cdot LS \tag{1}$$

where LS is a tilt-image shift sensitivity at an image height of 0.

Assume the imaging plane (X-Y plane) in a polar coordinate system (R-Θ coordinate system) with a center position O as an origin, and (r, θ) is a coordinate of the predetermined image point position A. That is, in this embodiment, the predetermined image point position A is a position on the imaging plane represented by a plurality of parameters. The image height on the horizontal axis in FIG. 3 is an image height $h_r$ in the R direction in the polar coordinate system illustrated in FIG. 4. A tilt-image-shift sensitivity coefficient $k_{LS\_r}(h_r)$ at an image height $h_r$ against the tilt-image shift sensitivity LS is expressed by the following expression (2):

$$k_{LS\_r}(h_r) = LS_r(h_r)/LS \tag{2}$$

where $LS_r(h_r)$ is a tilt-image shift sensitivity at an image height $h_r$.

The image-point moving amount $t_{x0}$ is expressed by the following expressions (3) to (5) using a parallel component $t_{rx0}$ parallel to a straight line OA and a vertical component $t_{\theta x0}$ perpendicular to the straight line OA:

$$t_{rx0} = t_{x0} \cdot \cos\theta = \omega_y \cdot LS \cdot \cos\theta \tag{3}$$

$$t_{\theta x0} = t_{x0} \cdot (-\sin\theta) = -\omega_y \cdot LS \cdot \sin\theta \tag{4}$$

$$|t_{x0}| = (t_{rx0}^2 + t_{\theta x0}^2)^{1/2} \tag{5}$$

The parallel component trio has a positive sign in the direction separating from the center position O (R direction), and the vertical component $t_{\theta x0}$ has a positive sign in the direction orthogonal to the R direction toward the counterclockwise direction about the center position O (θ direction). The R direction and the θ direction are also referred to as a meridional direction and a sagittal direction, respectively.

Next, consider the image-point moving amount $t_x$ at the predetermined image point position A. The parallel component $t_{rx}$ parallel to the straight line OA is affected by the tilt-image shift sensitivity $LS_r(r)$ at the image height r, and the vertical component $t_{\theta x}$ perpendicular to the straight line OA is affected by the tilt-image shift sensitivity LS at the image height of 0. From the above, the image-point moving amount $t_x$ is expressed by the following expressions (6) to (8) using the parallel component $t_{rx}$ and the vertical component $t_{\theta x}$:

$$t_{rx} = k_{LS\_r}(r) \cdot t_{rx0} = k_{LS\_r}(r) \cdot \omega_y \cdot LS \cdot \cos\theta \tag{6}$$

$$t_{\theta x} = k_{LS\_r}(0) \cdot t_{\theta x0} = -\omega_y \cdot LS \cdot \sin\theta \tag{7}$$

$$|t_x| = (t_{rx}^2 + t_{\theta x}^2)^{1/2} \tag{8}$$

In this way, the image-point moving amount $t_x$ at the predetermined image point position A when the rotation blur amount ωy occurs about the Y-axis can be calculated. Similarly, an image-point moving amount $t_y$ at the predetermined image point position A in the polar coordinate system when the rotation blur amount $\omega_x$ occurs about the X-axis is expressed by the following expressions (9) to (11) using a parallel component $t_{ry}$ parallel to the straight line OA and a vertical component $t_{\theta y}$ perpendicular to the straight line OA:

$$t_{ry} = k_{LS\_r}(r) \cdot t_{ry0} = k_{LS\_r}(r) \cdot \omega_x \cdot LS \cdot \sin\theta \tag{9}$$

$$t_{\theta y} = k_{LS\_r}(0) \cdot t_{\theta y0} = \omega_x \cdot LS \cdot \cos\theta \tag{10}$$

$$|t_y| = (t_{ry}^2 + t_{\theta y}^2)^{1/2} \tag{11}$$

As described above, the image-point moving amount t at the predetermined image point position A when the rotation blur amount ($\omega_x$, $\omega_y$) occurs about the predetermined rotation axis orthogonal to the optical axis on the imaging plane can be expressed by the following expressions (12) to (14) using a parallel component $t_r$ parallel to the straight line OA and a vertical component to perpendicular to the straight line OA.

$$t_r = t_{rx} + t_{ry} = \tag{12}$$
$$k_{LS\_r}(r) \cdot LS(\omega_y \cdot \cos\theta + \omega_x \cdot \sin\theta) = K_1(r,\theta) \cdot \omega_y + K_2(r,\theta) \cdot \omega_x$$

$$t_\theta = t_{\theta x} + t_{\theta y} = LS(-\omega_y \cdot \sin\theta + \omega_x \cdot \cos\theta) = K_3(r,\theta) \cdot \omega_y + K_4(r,\theta) \cdot \omega_x \tag{13}$$

$$|t| = (t_r^2 + t_\theta^2)^{1/2} \tag{14}$$

Coefficients ($K_1$, $K_2$, $K_3$, $K_4$) in the expressions (12) and (13) are given as follows:

$$K_1(r,\theta) = k_{LS\_r}(r) \cdot LS \cdot \cos\theta$$

$$K_2(r,\theta) = k_{LS\_r}(r) \cdot LS \cdot \sin\theta$$

$$K_3(r,\theta) = -LS \cdot \sin\theta$$

$$K_4(r,\theta) = LS \cdot \cos\theta$$

Figures 5A, 5B:
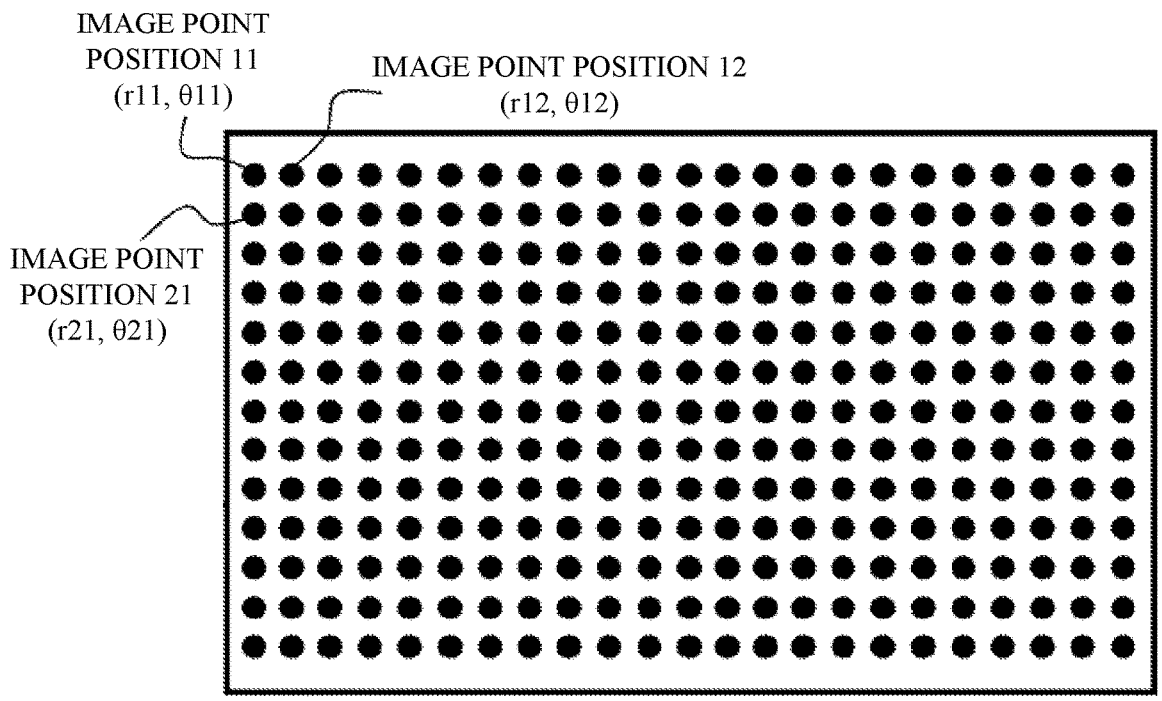
FIG. 5A illustrates image point positions on an imaging plane.
FIG. 5B illustrates a correction coefficient table having correction coefficient information according to the image point position.

As expressed by the expressions (12) to (14), the image-point moving amount t includes correction coefficient information ($K_1$, $K_2$, $K_3$, $K_4$) including the tilt-image shift sensitivity and the position information (r, θ) at the image point position, and a rotation blur amount ($\omega_x$, $\omega_y$). In this embodiment, the lens memory 106 previously stores as the information on the tilt-image shift sensitivity a correction coefficient table of the correction coefficient information ($K_1$, $K_2$, $K_3$, $K_4$) in a matrix format defined by the image point position illustrated in FIGS. 5A and 5B. This configuration can easily obtain the image-point moving amount t at the predetermined image point position A when the rotation blur amount ($\omega_x$, $\omega_y$) occurs. An interval between adjacent image point positions in the correction coefficient table is properly set. The correction coefficient table may be managed not in the polar coordinate system but in the orthogonal coordinate system.

The information on the tilt-image shift sensitivity may include the tilt-image shift sensitivity for each image height in order to reduce the information stored in the lens memory 106, or may provide the image-point moving amount t using position information on a predetermined image point position that is a target of the image stabilization. The position information on the image point position may be information on a polar coordinate system or information on a predetermined coordinate system (such as an orthogonal coordinate system).

Setting of Image-Stabilization Position Information on Imaging Plane

This embodiment can switch a setting mode of the image pickup system 1 to an image-center IS mode that sets a predetermined image point position (image stabilization position) that is a target of the image stabilization to the center of the imaging plane, or an IS spot setting mode that can set an image stabilization point to a predetermined image point position. In a case where the IS spot setting mode is set, the image stabilization position can be set on the display/operation unit 203. The position settable by the display/operation unit 203 may be linked with the image point position where autofocus is performed or the image point position where automatic photometry (light metering) is performed. The image point position where the autofocus is performed may be a position automatically detected by the pupil detection, person detection, or the like. The IS position information (r, θ) on the imaging plane is sent to the camera microcomputer 202, and the correction coefficient information to be used is selected from the correction coefficient table.

Motion Detecting Signal

The gyro sensor 205 detects angular velocities about a plurality of rotation axes of the image pickup system 1 and outputs information on the rotation blur amount as a motion detecting signal. In this embodiment, the gyro sensor 205 detects angular velocities about the X-axis and the Y-axis, and outputs information on the rotation blur amount ($\omega_x$, $\omega_y$). The acceleration sensor 206 detects accelerations in a plurality of axial directions of the image pickup system 1 and outputs information on the translational blur amount as a motion detecting signal. In this embodiment, the acceleration sensor 206 detects accelerations in the X-axis and Y-axis directions, and outputs information on the translational blur amount ($a_x$, $a_y$). The gyro sensor 205 may include a plurality of sensors, each of which detects an angular velocity about a single axis. Similarly, the acceleration sensor 206 may include a plurality of sensors, each of which detects acceleration in a single direction.

Acquisition of Image-Stabilization Driving Amount

The camera microcomputer 202 acquires an IS driving amount using the information on the tilt-image shift sensitivity, the IS position information, and the motion detecting signal. For example, in a case where an image blur at a predetermined image point position A due to the rotation blur is corrected by IIS, the image sensor 201 may be moved so as to cancel the image-point moving amount t. An IS driving amount x in the X-axis direction and an IS driving amount y in the Y-axis direction of the IIS actuator 210 are expressed by the following expressions (15) and (16):

$$x = t_r \cdot \cos\theta - t_\theta \cdot \sin\theta = \omega_y \{\sin^2\theta + k_{LS\_r}(r) \cdot \cos^2\theta\} LS + \omega_x \{k_{LS\_r}(r) - 1\} LS \cdot \sin\theta \cdot \cos\theta = K'_1(r,\theta) \cdot \omega_y + K'_2(r,\theta) \cdot \omega_x \quad (15)$$

$$y = t_r \cdot \sin\theta + t_\theta \cdot \cos\theta = \omega_y \{k_{LS\_r}(r) - 1\} LS \cdot \sin\theta \cdot \cos\theta + \omega_x \{k_{LS\_r}(r) \cdot \sin^2\theta + \cos^2\theta\} LS = K'_3(r,\theta) \cdot \omega_y + K'_4(r,\theta) \cdot \omega_x \quad (16)$$

Coefficients ($K'_1$, $K'_2$, $K'_3$, $K'_4$) in the expressions (15) and (16) are given as follows:

$$K'_1(r,\theta) = \{\sin^2\theta + k_{LS\_r}(r) \cdot \cos^2\theta\} LS$$

$$K'_2(r,\theta) = \{k_{LS\_r}(r) - 1\} LS \cdot \sin\theta \cdot \cos\theta$$

$$K'_3(r,\theta) = \{k_{LS\_r}(r) - 1\} LS \cdot \sin\theta \cdot \cos\theta$$

$$K'_4(r,\theta) = \{k_{LS\_r}(r) \cdot \sin^2\theta + \cos^2\theta\} LS$$

Figure 6:
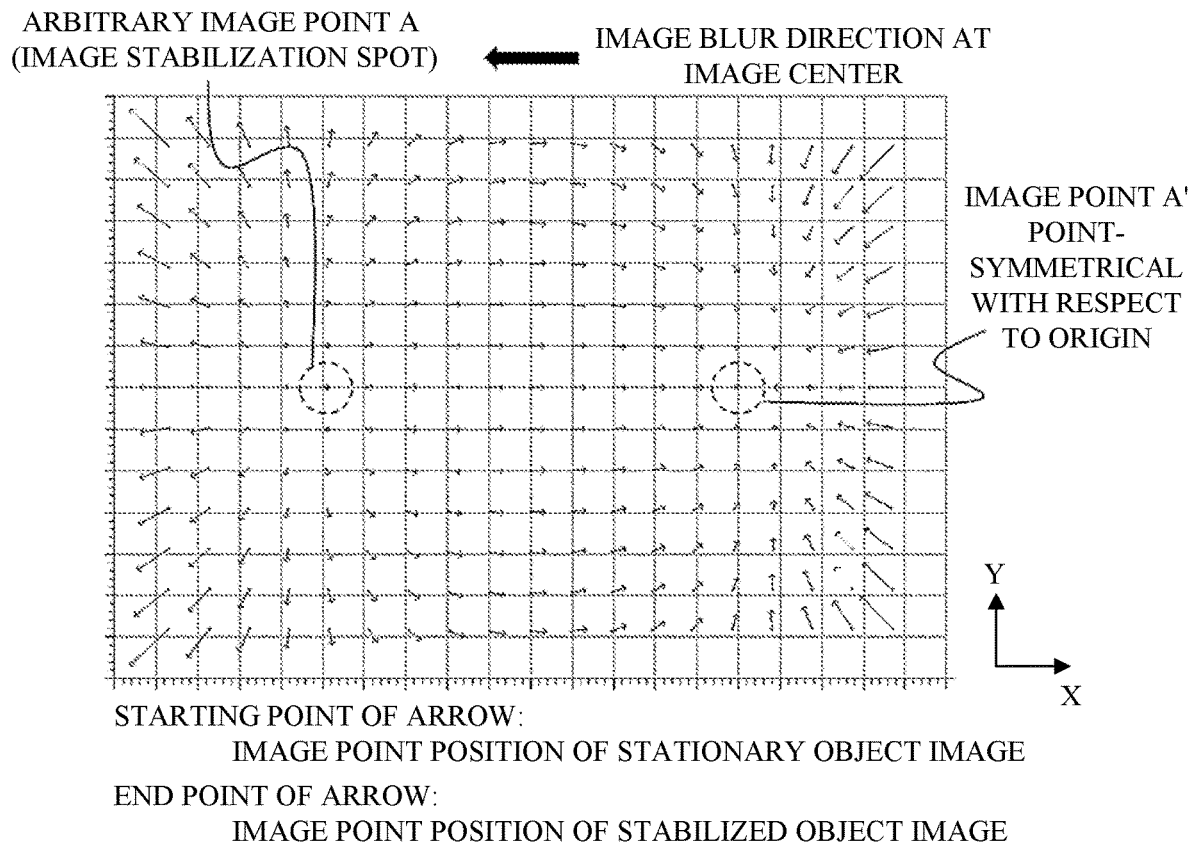
FIG. 6 illustrates a ratio and direction of an image-point moving amount of a correction residue generated at each image point when an image blur at a predetermined image point position is corrected by IIS in the first embodiment.

FIG. 6 illustrates a ratio and direction of the image-point moving amount of the correction residue generated at each image point when the image blur at the predetermined image point position A is corrected by IIS in this embodiment. As illustrated in FIG. 6, the image blur at the set predetermined image point position A is satisfactorily corrected while the image blur at the image center is allowed. Since the image point movement of the same motion vector as that at the image point position A occurs at the image point position A' that is point-symmetric to the image point position A' with respect to the image center as the origin, the image blur at the image point position A' is also corrected. Hence, a distribution of the image blur amount in the entire image can be maintained low and the image blur of the entire image can be reduced by properly setting an image stabilization position to a predetermined position outside the optical axis to the extent that the image blur at the image center does not pose strangeness.

As expressed by the expressions (15) and (16), the IS driving amount (x, y) includes the correction coefficient information ($K'_1$, $K'_2$, $K'_3$, $K'_4$) and the rotation blur amount ($\omega_x$, $\omega_y$). Thus, the correction coefficient table of the correction coefficient information ($K'_1$, $K'_2$, $K'_3$, $K'_4$) in a matrix format may be stored as the information on the tilt-image shift sensitivity in the lens memory 106. By using $K'_1$ or the like instead of the above correction coefficient information ($K_1$, $K_2$, $K_3$, $K_4$), the IS driving amount (x) at the predetermined image point position A when the rotation blur amount ($\omega_x$, $\omega_y$) occurs can be easily obtained.

In the case of OIS, the OIS eccentric (decentering) sensitivity TS(h) for each image height of the OIS optical system 1014 increases as the image height becomes higher, so that the IS driving amount may be acquired based on the OIS eccentric sensitivity TS(h). Thereby, the image stabilization can be performed with high accuracy.

Regarding the image blur derived from the translation blur, the IS driving amount may be acquired using the information on the translation blur amount from the acceleration sensor 206. The IS driving amount for the translation blur may be acquired by converting the translation blur amount ($a_x$, $a_y$) into the rotation blur amount ($\omega_x$, $\omega_y$) using the in-focus object distance information. In a case where the rotation blur and translation blur occur at the same time, the IS driving amount may be acquired by adding the IS driving amount for the translation blur and the IS driving amount for the rotation blur. The IS driving amount for the translation blur at the predetermined image point position may be acquired by multiplying the converted rotation blur amount by the correction coefficient included in the information on the tilt-image shift sensitivity.

In a case where the in-focus position is close to the short distance end, the translational component of the object plane generated by the rotation blur becomes large. The IS driving amount for the image blur caused by the translational component according to the object distance may be acquired by the above method.

The tilt-image shift sensitivity changes according to the object distance and the focal length (imaging angle of view) on which the imaging optical system 101 is focused. In this embodiment, the lens memory 106 stores a plurality of correction coefficient tables that differ according to an in-focus position determined by the focus optical system 1011 and a focal length determined by the magnification varying optical system 1012. Thereby, the image stabilization can be satisfactorily provided at a predetermined image point position even during the magnification variation (zooming) or focusing.

The lens apparatus 100 may be detachably attached to the image pickup apparatus 200. In this case, the information on the proper tilt-image shift sensitivity may be used for each lens apparatus 100. Thereby, even where a different lens apparatus 100 is attached to the image pickup apparatus 200 and used, the image blur at a predetermined image point position can be satisfactorily corrected.

Second Embodiment

This embodiment expands the information on the tilt-image shift sensitivity is wider than the first embodiment. Since the configuration of the image pickup system 1 and the processing in the image stabilization in this embodiment are the same as those in the first embodiment, a detailed description thereof will be omitted.

In this embodiment, a distortion amount by which the object image of the imaging optical system 101 is deformed into a barrel shape is larger than that in the first embodiment. In an imaging optical system with a small distortion amount, an image-point moving amount at any image point position in a direction orthogonal to an image-point moving direction at the image center when the imaging optical system is tilted is almost similar to an image-point moving amount at the image center. On the other hand, the imaging optical system 101 according to this embodiment has a large distortion amount. Then, the image-point moving amount in the direction orthogonal to the image-point moving direction at the image center when the imaging optical system 101 is tilted becomes smaller as a position is more separated from the image center. Thus, in this embodiment, the lens memory 106 stores the information on a significant tilt-image shift sensitivity for the image-point moving amount in the direction orthogonal to the image-point moving direction at the image center caused by the rotation blur.

Figure 7:
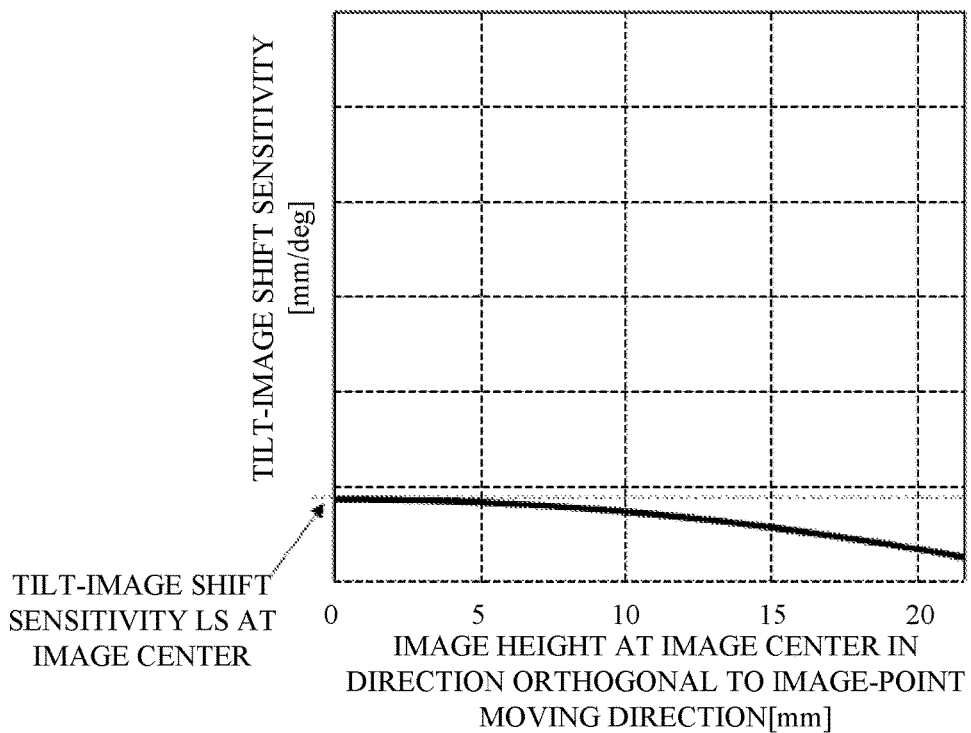
FIG. 7 illustrates a relationship between an image height in a direction orthogonal to an image-point moving direction at an image center and a tilt-image shift sensitivity when an imaging optical system according to a second embodiment is tilted.
Figure 8:
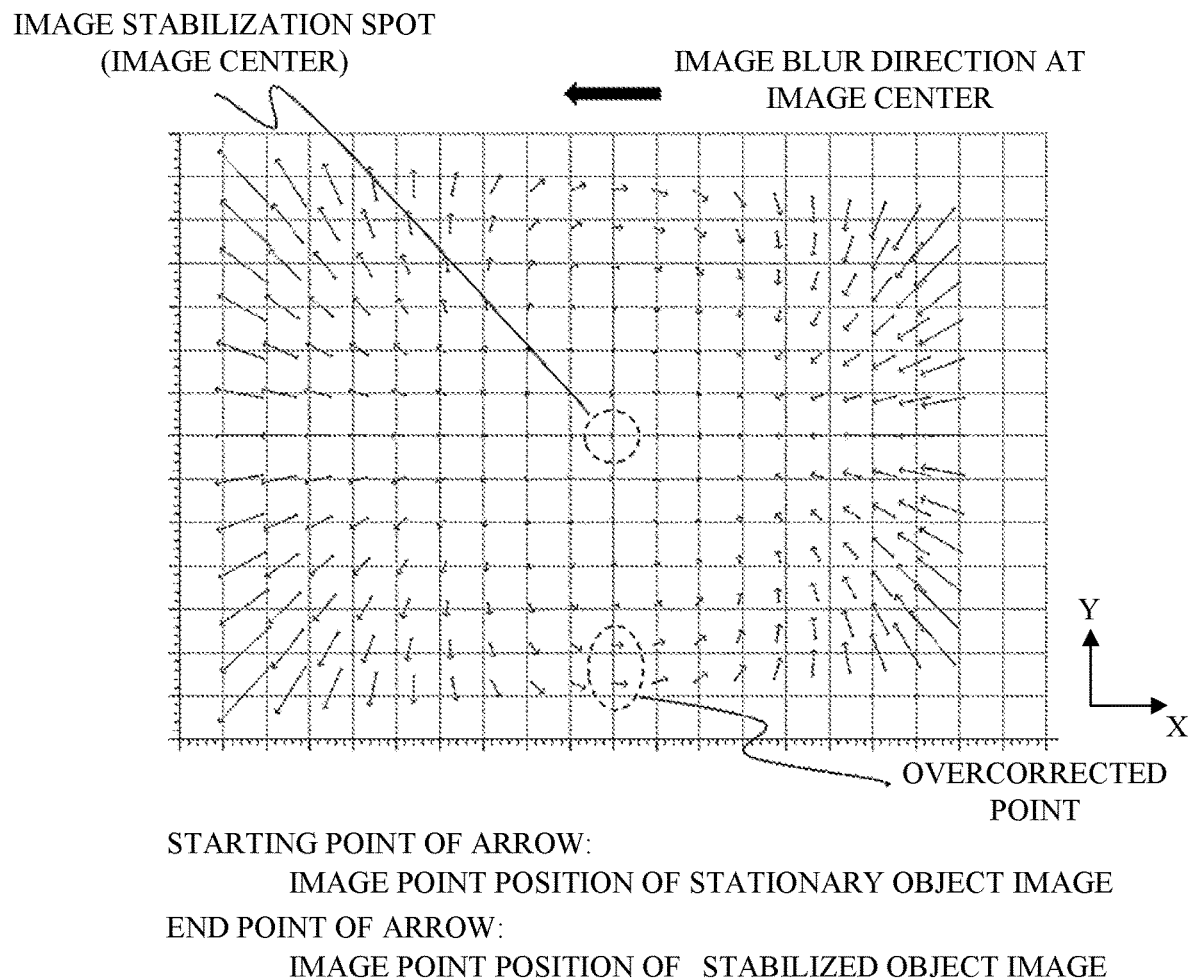
FIG. 8 illustrates a ratio and direction of an image-point moving amount of a correction residue generated at each image point when an image blur at an image center is corrected by IIS in the second embodiment.

FIG. 7 illustrates a relationship between the image height in the direction orthogonal to the image-point moving direction at the image center and the tilt-image shift sensitivity (image-point moving amount) when the imaging optical system 101 according to this embodiment is tilted. FIG. 8 illustrates a ratio and direction of the image-point moving amount of the correction residue generated at each image point when the image blur at the image center according to this embodiment is corrected by IIS. An image height in a direction orthogonal to an image-point moving direction at the center position O on the imaging plane on the horizontal axis illustrated FIG. 7 is an image height in a direction orthogonal to the R direction in the polar coordinate system. As illustrated in FIG. 7, in this embodiment, the tilt-image shift sensitivity $LS_\theta(h_\theta)$ at the image height $h_\theta$ in the direction orthogonal to the image-point moving direction at the image center when the imaging optical system 101 having a large distortion amount is tilted is smaller than the tilt-image shift sensitivity LS at the image center. Therefore, if the image stabilization is provided at an image point position where the image height is high with the IS driving amount acquired with the tilt-image shift sensitivity LS at the image center, the overcorrection occurs as illustrated in FIG. 8.

Accordingly, this embodiment adds the tilt-image shift sensitivity to the information described in the first embodiment, and creates information that includes the influence of the image-point moving amount for each image height in a direction parallel to the rotation axis when the imaging optical system 101 is tilted. The tilt-image shift sensitivity coefficient $k_{LS\_\theta}(h_\theta)$ at the image height $h_\theta$ against the tilt-image shift sensitivity LS at the image center is expressed by the following expression (17):

$$k_{LS\_\theta}(h_\theta) = LS_\theta(h_\theta)/LS \quad (17)$$

When a rotation blur amount $(\omega_x, \omega_y)$ occurs, a parallel component $t_r$ parallel to the straight line OA, which is a polar coordinate system component of the image-point moving amount t at a predetermined image point position A, and a vertical component to perpendicular to the straight line OA are expressed by the following expressions (12a) and (13a), respectively:

$$t_r = t_{rx} + t_{ry} = k_{LS\_r}(r) \cdot k_{LS\_\theta}(0) \cdot LS(\omega_y \cdot \cos\theta + \omega_x \cdot \sin\theta) = K_1(r,\theta) \cdot \omega_y + K_2(r,\theta) \cdot \omega_x \quad (12a)$$

$$t_\theta = t_{\theta x} + t_{\theta y} = k_{LS\_r}(0) \cdot k_{LS\_\theta}(r) \cdot LS(-\omega_y \sin\theta + \omega_x \cos\theta) = K_3(r,\theta) \cdot \omega_y + K_4(r,\theta) \cdot \omega_x \quad (13a)$$

Coefficients ($K_1$, $K_2$, $K_3$, $K_4$) in the expression (12a) and (13a) are given as follows:

$$K_1(r,\theta) = k_{LS\_r}(r) \cdot k_{LS\_\theta}(0) \cdot LS \cdot \cos\theta$$

$$K_2(r,\theta) = k_{LS\_r}(r) \cdot k_{LS\_\theta}(0) \cdot LS \cdot \sin\theta$$

$$K_3(r,\theta) = -k_{LS\_r}(0) \cdot k_{LS\_\theta}(r) \cdot LS \cdot \sin\theta$$

$$K_4(r,\theta) = k_{LS\_r}(0) \cdot k_{LS\_\theta}(r) \cdot LS \cdot \cos\theta$$

An IS driving amount x in the X-axis direction and an IS driving amount y in the Y-axis direction of the IIS actuator 210 are expressed by the following expressions (15a) and (16a):

$$x = t_r \cdot \cos\theta - t_\theta \cdot \sin\theta = \omega_y \{k_{LS\_\theta}(r) \cdot \sin^2\theta + k_{LS\_r}(r) \cdot \cos^2\theta\} LS + \omega_x \{k_{LS\_r}(r) - k_{LS\_\theta}(r)\} LS \cdot \sin\theta \cdot \cos\theta = K'_1(r,\theta) \cdot \omega_y + K'_2(r,\theta) \cdot \omega_x \quad (15a)$$

$$y = t_r \cdot \sin\theta = t_\theta \cdot \cos\theta = \omega_y \{k_{LS\_r}(r) - k_{LS\_\theta}(r)\} LS \cdot \sin\theta \cdot \cos\theta + \omega_x \{k_{LS\_r}(r) \cdot \sin^2\theta + k_{LS\_\theta}(r) \cdot \cos^2\theta\} LS = K'_3(r,\theta) \cdot \omega_y + K'_4(r,\theta) \cdot \omega_x \quad (16a)$$

Coefficients (K'1, K'2, K'3, K'4) in the expressions (15a) and (16a) are given as follows:

$$K'_1(r,\theta) = \{k_{LS\_\theta}(r) \cdot \sin^2\theta + k_{LS\_r}(r) \cdot \cos^2\theta\} LS$$

$$K'_2(r,\theta) = \{k_{LS\_r}(r) - k_{LS\_\theta}(r)\} LS \cdot \sin\theta \cdot \cos\theta$$

$$K'_3(r,\theta) = \{k_{LS\_r}(r) - k_{LS\_\theta}(r)\} LS \cdot \sin\theta \cdot \cos\theta$$

$$K'_4(r,\theta) = \{k_{LS\_r}(r) \cdot \sin^2\theta + k_{LS\_\theta}(r) \cos^2\theta\} LS$$

As described above, this embodiment acquires the IS driving amount based on the tilt-image shift sensitivities for each image height in the direction parallel to the rotation axis and the direction orthogonal to the rotation axis. Thereby, even when the image pickup system 1 uses the imaging optical system 101 having a large distortion amount, the image stabilization can be satisfactorily provided at a predetermined image point position.

An optical system designed by a fisheye lens projection method (such as an equidistant projection method and an equisolid angle projection method) also has a significant tilt-image shift sensitivity characteristic against the image-point moving amount in the θ direction. Thus, the IS driving amount may be acquired based on the tilt-image shift sensitivities for each image height in the R and θ directions.

In a case where a large image-stabilization angle is guaranteed as a specification of the image stabilization mechanism, the IS driving amount may be determined based on the tilt-image shift sensitivity according to this embodiment.

EXAMPLES

Referring now to the accompanying drawings, a description will be given of examples of the imaging optical system 101 according to the present invention.

Figure 9:
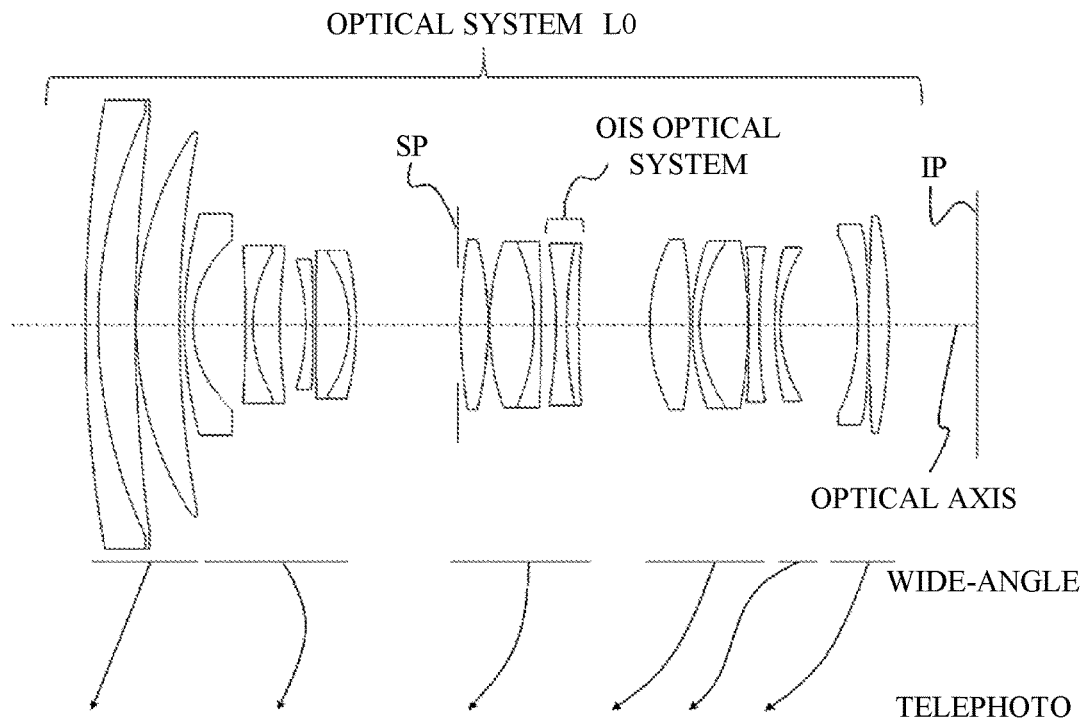
FIG. 9 is a sectional view of an optical system according to Example 1 at a wide-angle end in an in-focus state on an object at infinity.
Figure 11:
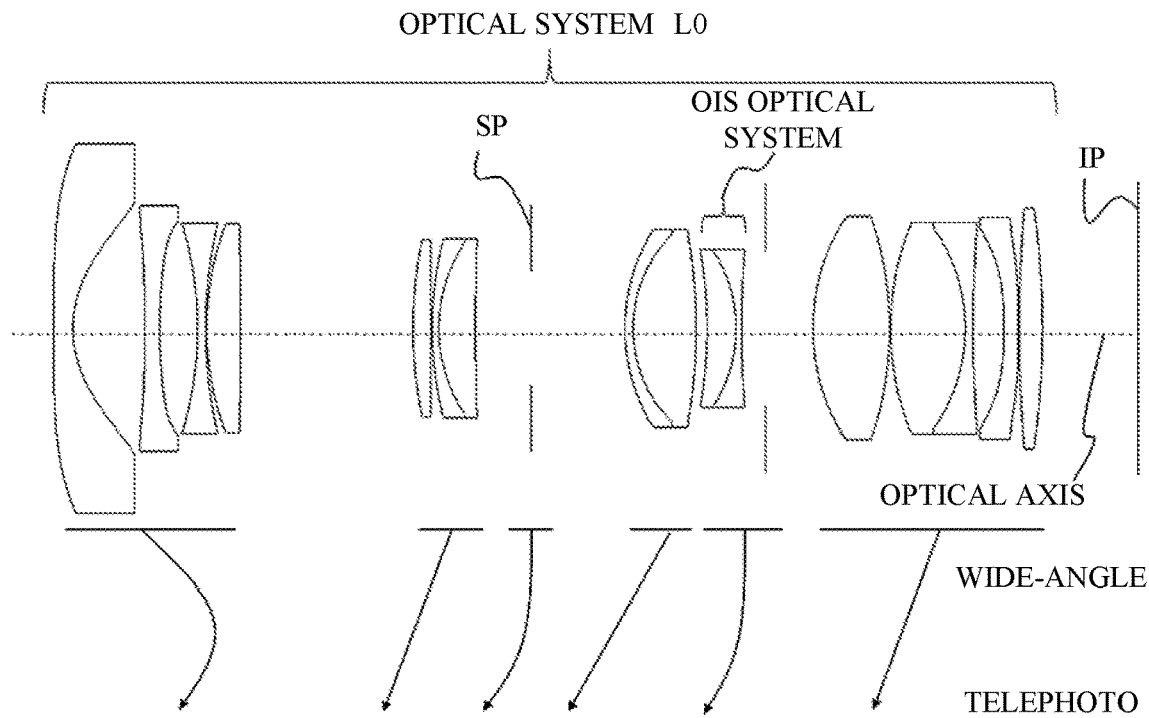
FIG. 11 is a sectional view of an optical system according to Example 2 at a wide-angle end in an in-focus state on an object at infinity.
Figure 13:
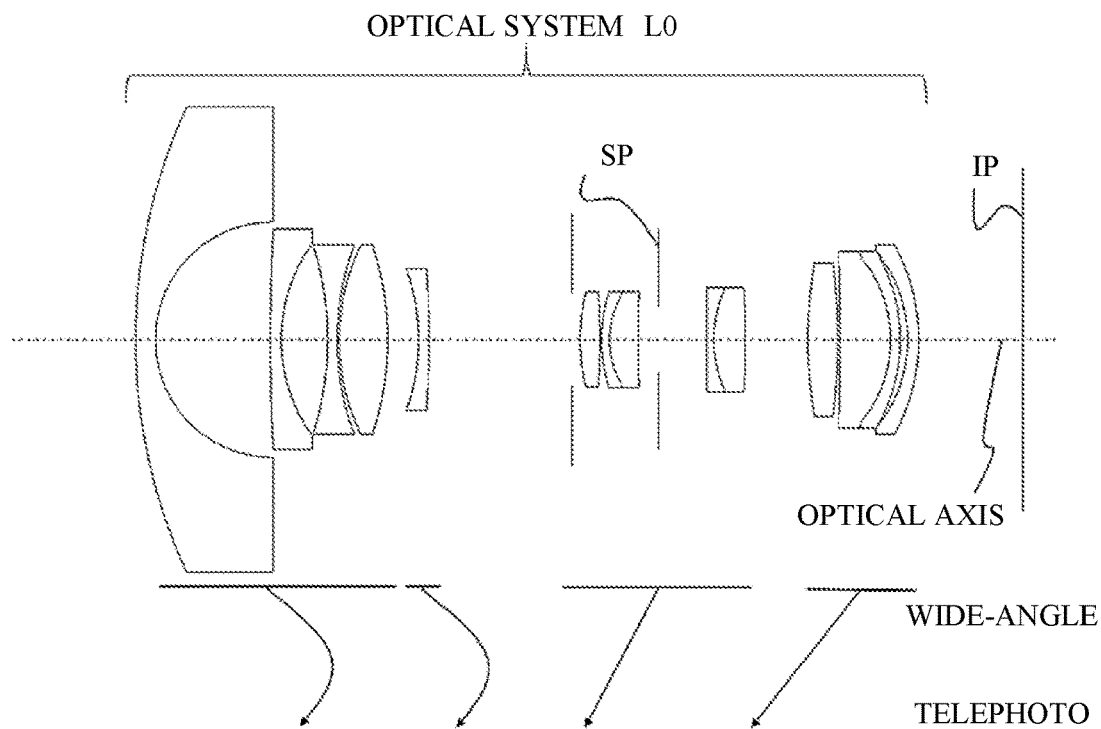
FIG. 13 is a sectional view of an optical system according to Example 3 at a wide-angle end in an in-focus state on an object at infinity.
Figure 15:
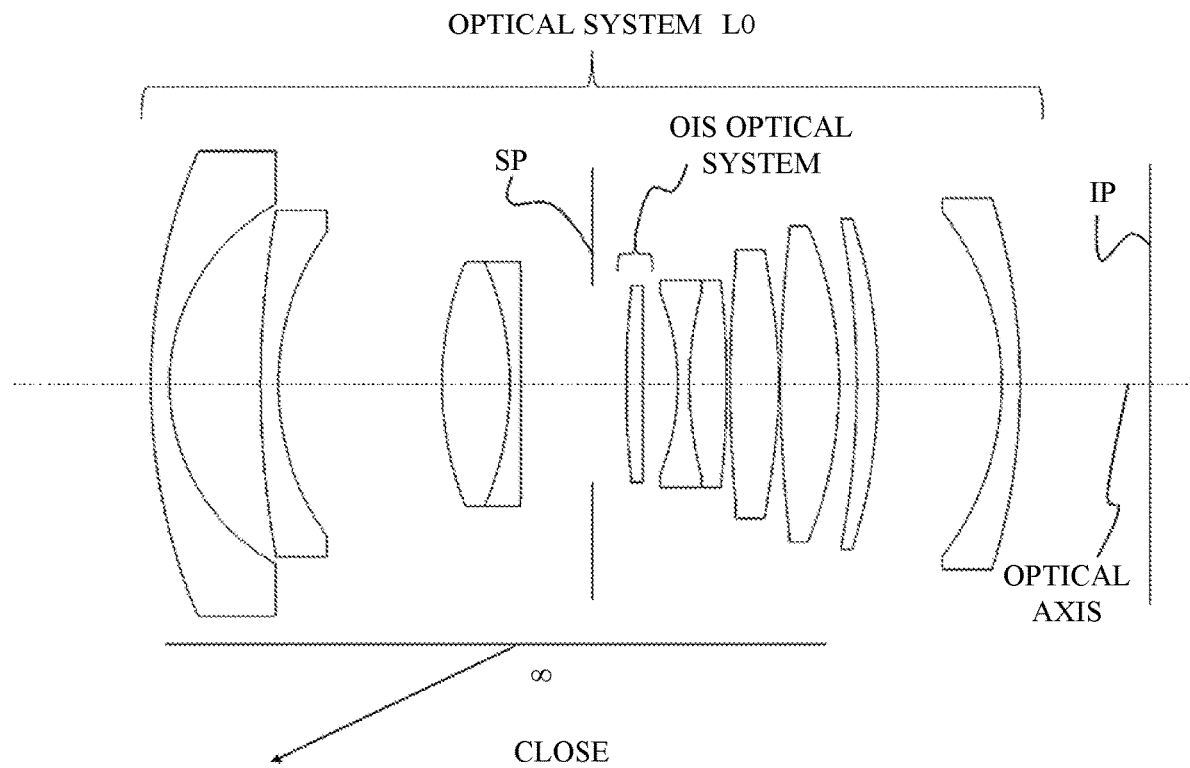
FIG. 15 is a sectional view of an optical system according to Example 4 at a wide-angle end in an in-focus state on an object at infinity.

FIGS. 9, 11, and 13 are sectional views of the optical system L0 according to Examples 1 to 3 at a wide-angle end in an in-focus state on an object at infinity, respectively. An arrow illustrated in each sectional view represents a moving locus of each lens unit during zooming from the wide-angle end to a telephoto end. FIG. 15 is a sectional view of the optical system L0 according to Example 4 in an in-focus state on an object at infinity. An arrow illustrated in FIG. 15 represents a moving locus of the lens unit during focusing from infinity to a short distance end (or close) end. The optical system L0 according to each example is used for an image pickup apparatus such as a digital video camera, a digital still camera, a broadcasting camera, a surveillance camera, and a smartphone camera.

In each sectional view, a left side is an object side and a right side is an image side. The optical system L0 according to each example includes a plurality of lens units. As used herein, a lens unit is a group of lenses that move or stand still integrally during zooming, focusing, or image stabilization. That is, in the optical system L0 according to each example, a distance between adjacent lens units changes during zooming or focusing. The lens unit may include one or more lenses. The lens unit may include a diaphragm (aperture stop).

SP denotes the diaphragm. IP denotes an image plane, on which an imaging plane of an image sensor (photoelectric conversion element), such as a CCD sensor or a CMOS sensor, is disposed. The OIS optical system is eccentric to the optical axis of the optical system L0 during OIS.

The projection method of the optical system L0 according to Examples 1, 2, and 4 is a central projection method (Y=f tan θ). The projection method of the optical system L0 according to Example 3 is an equisolid angle projection method (Y=2·f·sin(θ/2)).

Figure 10:
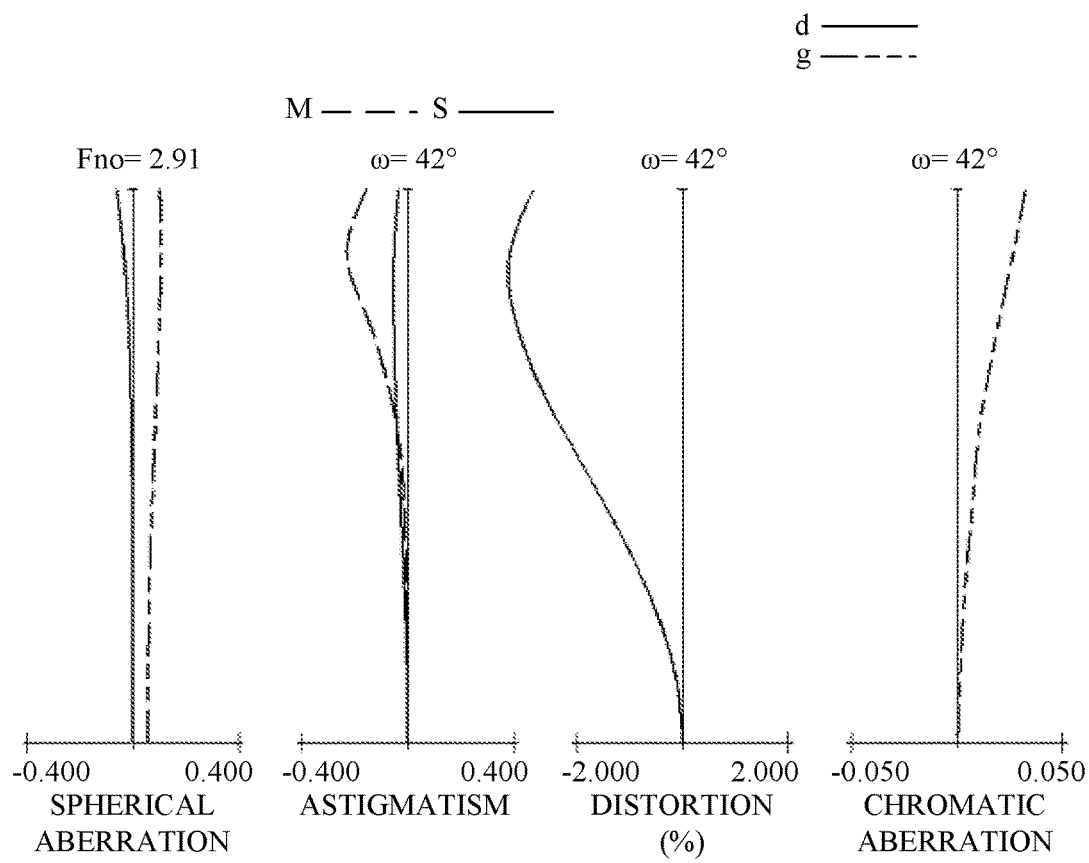
FIG. 10 is an aberration diagram of the optical system according to Example 1 at a wide-angle end in an in-focus state on an object at infinity.
Figure 12:
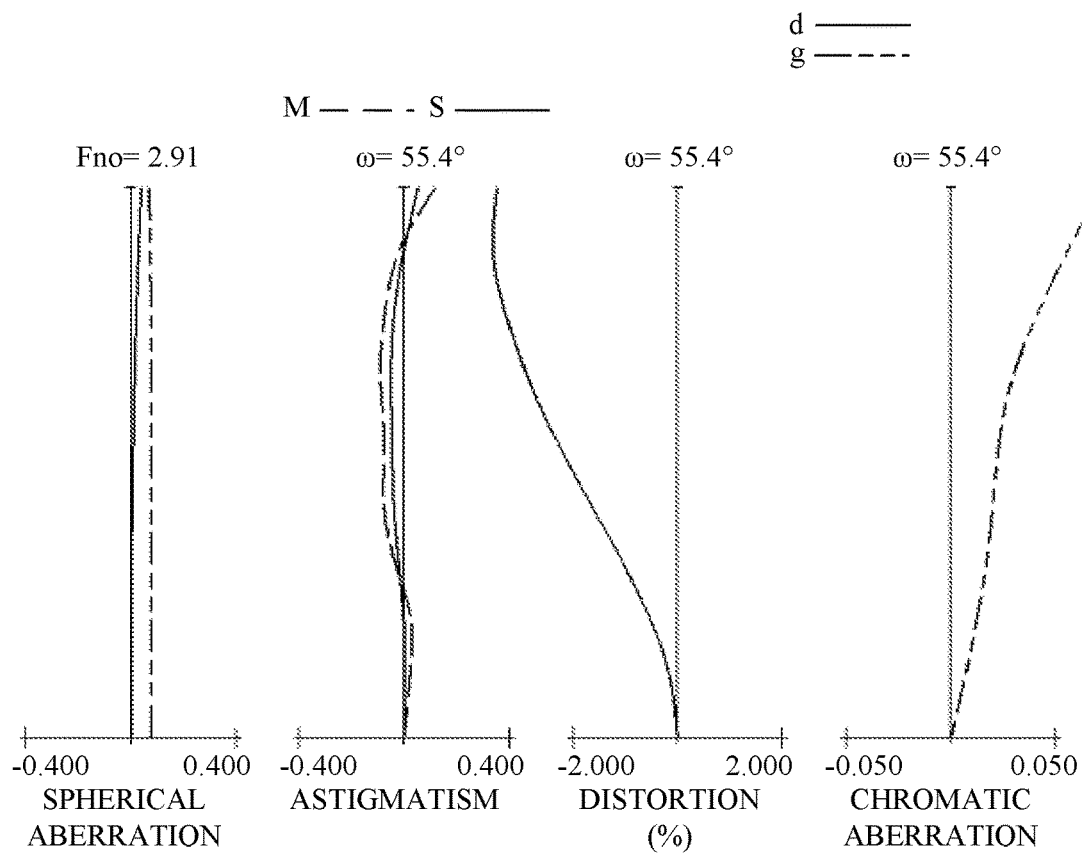
FIG. 12 is an aberration diagram of the optical system according to Example 2 at a wide-angle end in an in-focus state on an object at infinity.
Figure 14:
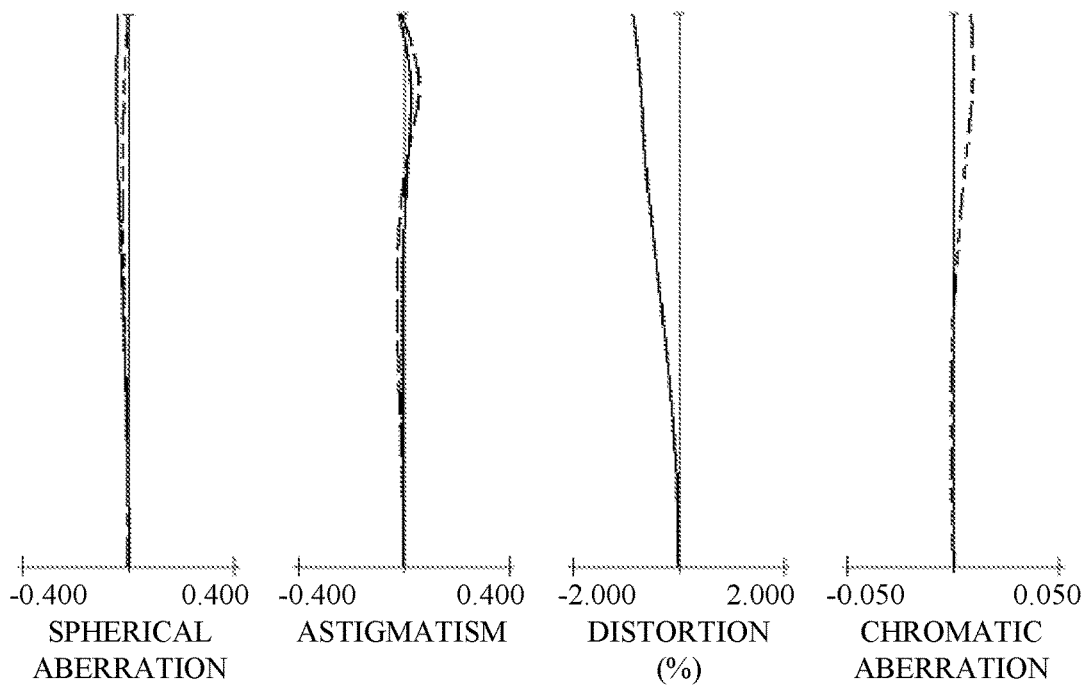
FIG. 14 is an aberration diagram of the optical system according to Example 3 at a wide-angle end in an in-focus state on an object at infinity.
Figure 16:
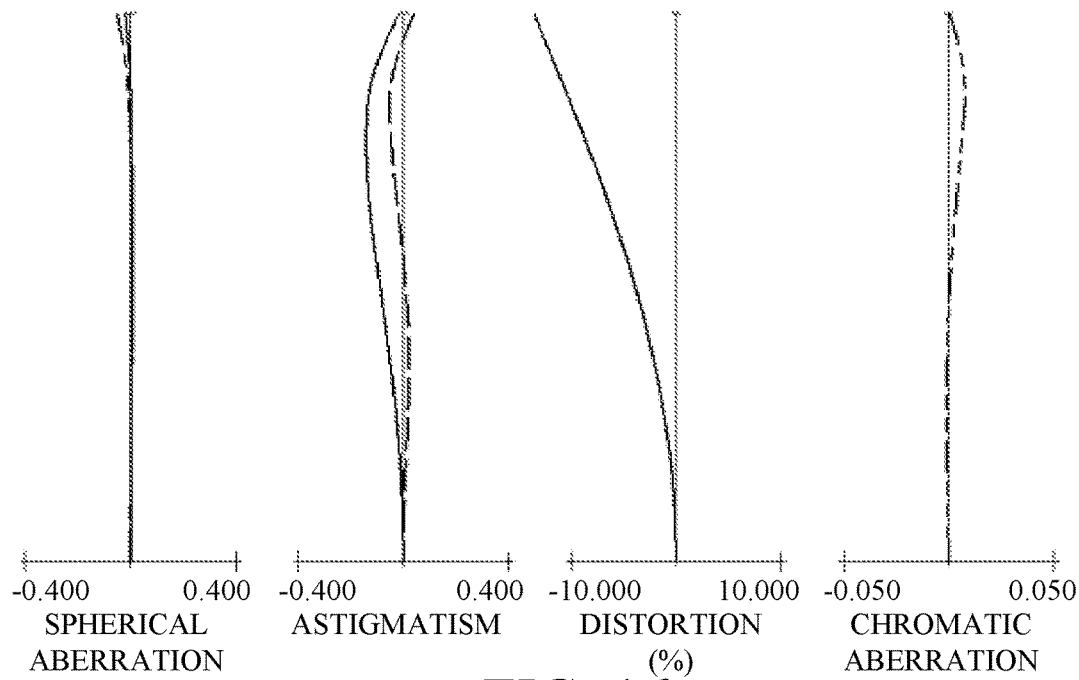
FIG. 16 is an aberration diagram of the optical system according to Example 4 at a wide-angle end in an in-focus state on an object at infinity.

FIGS. 10, 12, and 14 are aberration diagrams of the optical system L0 according to Examples 1 to 3 at the wide-angle end in the in-focus state on the object at infinity, respectively. FIG. 16 is an aberration diagram of the optical system L0 according to Example 4 in the in-focus state on the object at infinity.

In the spherical aberration diagram, Fno denotes an F-number and indicates the spherical aberration amounts for the d-line (wavelength 587.6 nm) and the g-line (wavelength 435.8 nm). In the astigmatism diagram, S denotes an astigmatism amount in a sagittal image plane, and M denotes an astigmatism amount in a meridional image plane. The distortion diagram illustrates a distortion amount for the d-line. A chromatic aberration diagram illustrates a lateral chromatic aberration for the g-line. ω denotes an imaging half angle of view (°).

Numerical examples 1 to 4 corresponding to Examples 1 to 4, respectively, will be illustrated below.

In the surface data in each numerical example, r denotes a radius of curvature of each optical surface, and d (mm) denotes an on-axis distance (a distance on the optical axis) between an m-th surface and an (m+1)-th surface, where m is a surface number counted from the light incident surface. nd denotes a refractive index of each optical member for the d-line, and vd denotes an Abbe number of the optical member. The Abbe number vd of a certain material is expressed as follows:

$$vd=(Nd-1)/(NF-NC)$$

where Nd, NF, and NC are refractive indexes for the d-line (wavelength 587.6 nm), F-line (wavelength 486.1 nm), and C-line (wavelength 656.3 nm) in the Fraunhofer lines.

In each numerical example, all values of d, a focal length (mm), an F-number, and a half angle of view (°) are values when the optical system L0 according to each example is focused on an object at infinity (infinity object). A backfocus (BF) is a distance on the optical axis from the final surface of the lens (the lens surface closest to the image plane) to the paraxial image plane in terms of an air conversion length. An overall optical length is a length obtained by adding the backfocus to a distance on the optical axis from the frontmost surface of the lens (the lens surface closest to the object) to the final surface of the lens.

In a case where the optical surface is aspherical, an asterisk * is added to the right side of the surface number. The aspherical shape is expressed as follows:

$$X = (h^2/R) / \left[1 + \{1 - (1+k)(h/R)^2\}^{1/2}\right] + A4 \times h^4 + A6 \times h^6 + A8 \times h^8 + A10 \times h^{10} + A12 \times h^{12}$$

where X is a displacement amount from the surface vertex in the optical axis direction, h is a height from the optical axis in the direction perpendicular to the optical axis, R is a paraxial radius of curvature, k is a conical constant, A4, A6, A8, A10, and A12 are aspherical coefficients of each order. "e±XX" in each aspherical coefficient means "×10^{±XX}"

The tilt-image shift sensitivity data and the eccentric sensitivity data for the eccentricity of the OIS optical system are illustrated in each numerical example. An acquiring method of them will be described with reference to FIGS. 17A to 17C.

Figure 17A:
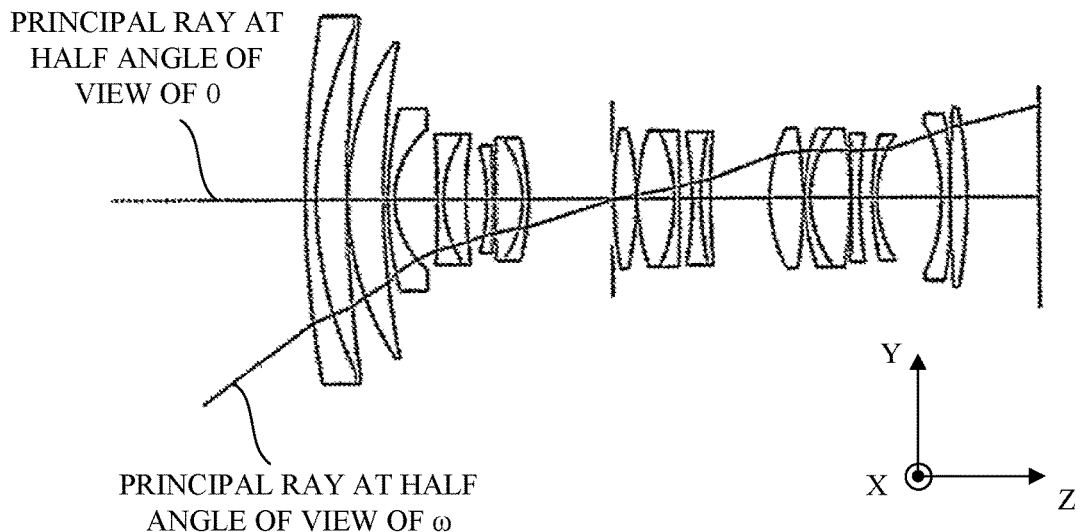
FIGS. 17A to 17C illustrate ray tracing of a principal ray of a d-line for each angle of view incident from an object plane in the optical system according to Example 1.
Figure 17B:
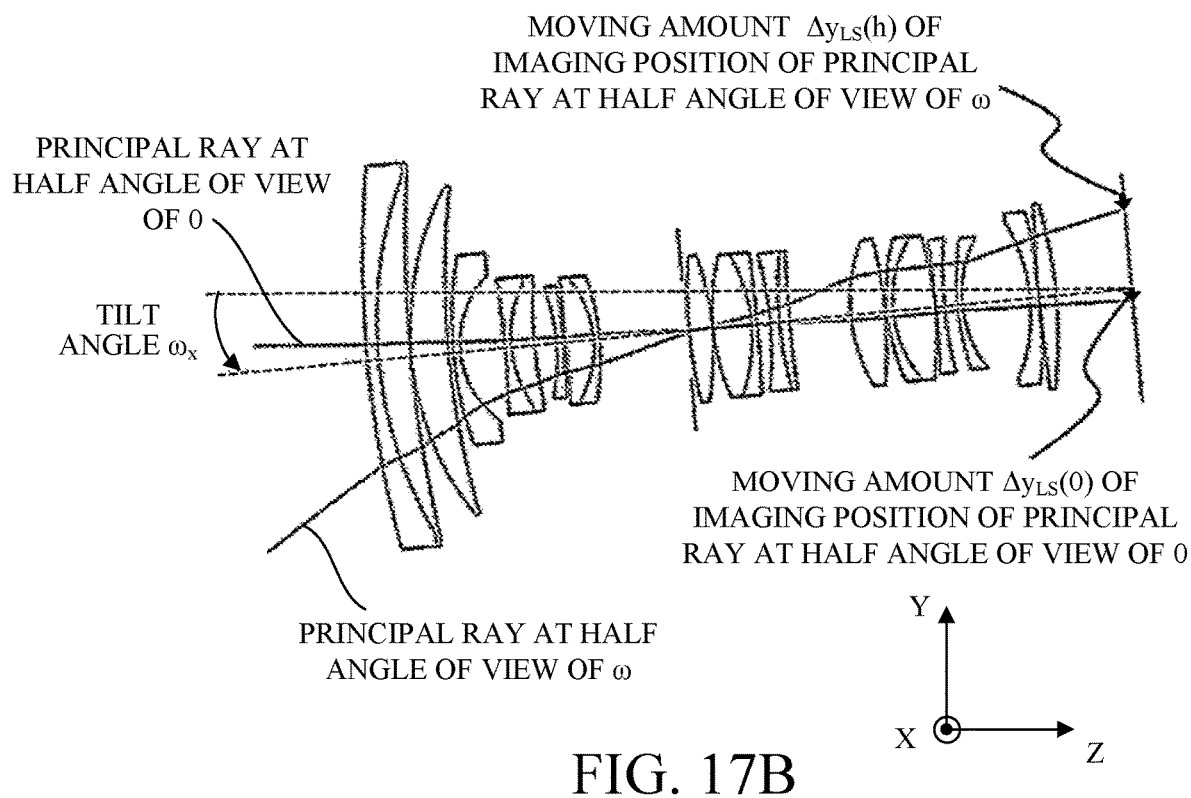
Figure 17C:
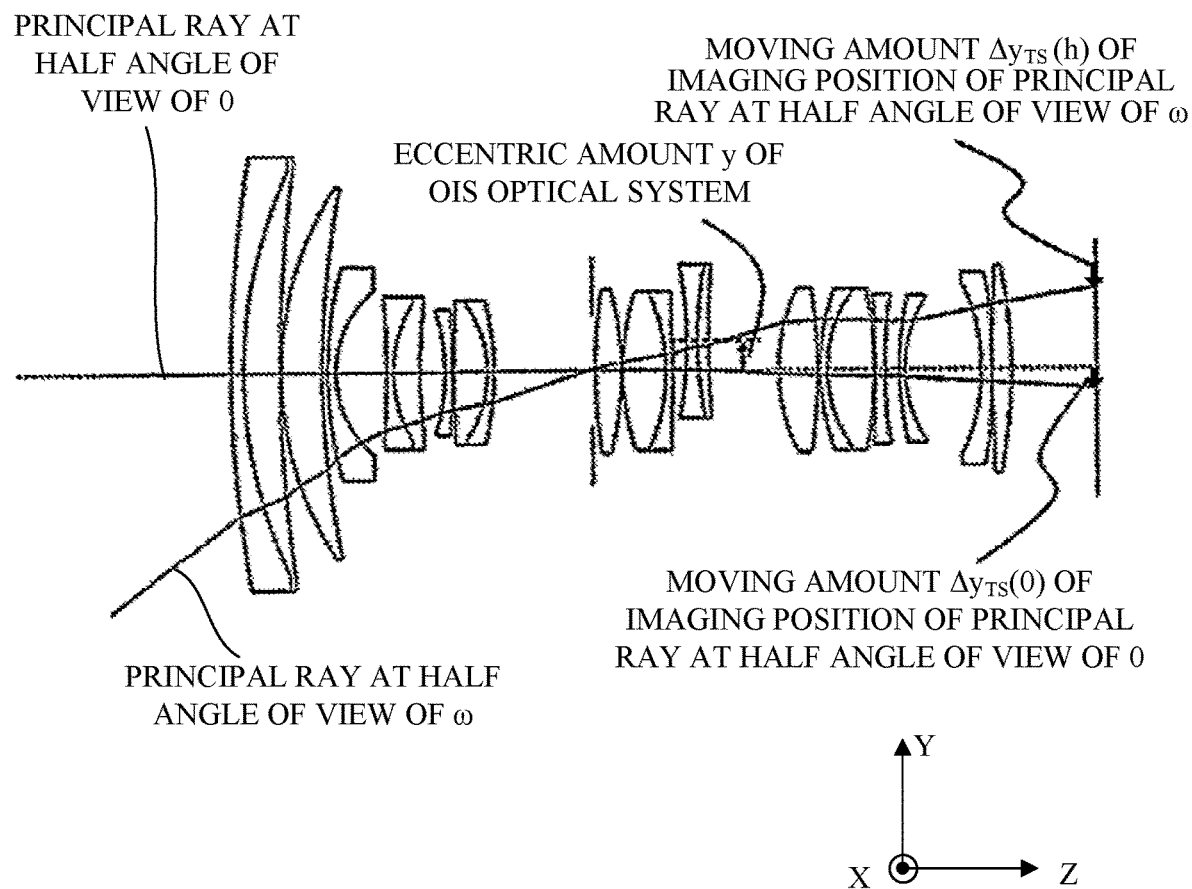
Figure 18A:
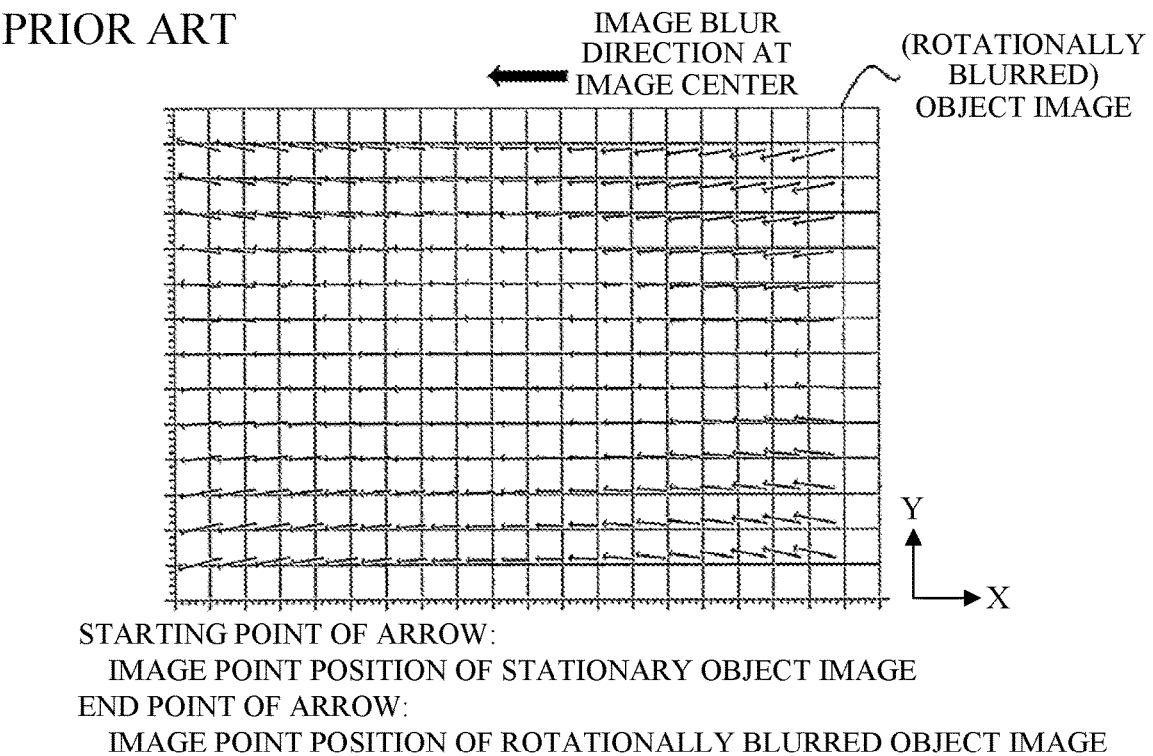
FIG. 18A illustrates a ratio and direction of an image-point moving amount at each image point on an object image when an image blur occurs in an −X-axis direction at an image center due to a rotation blur.
Figure 18B:
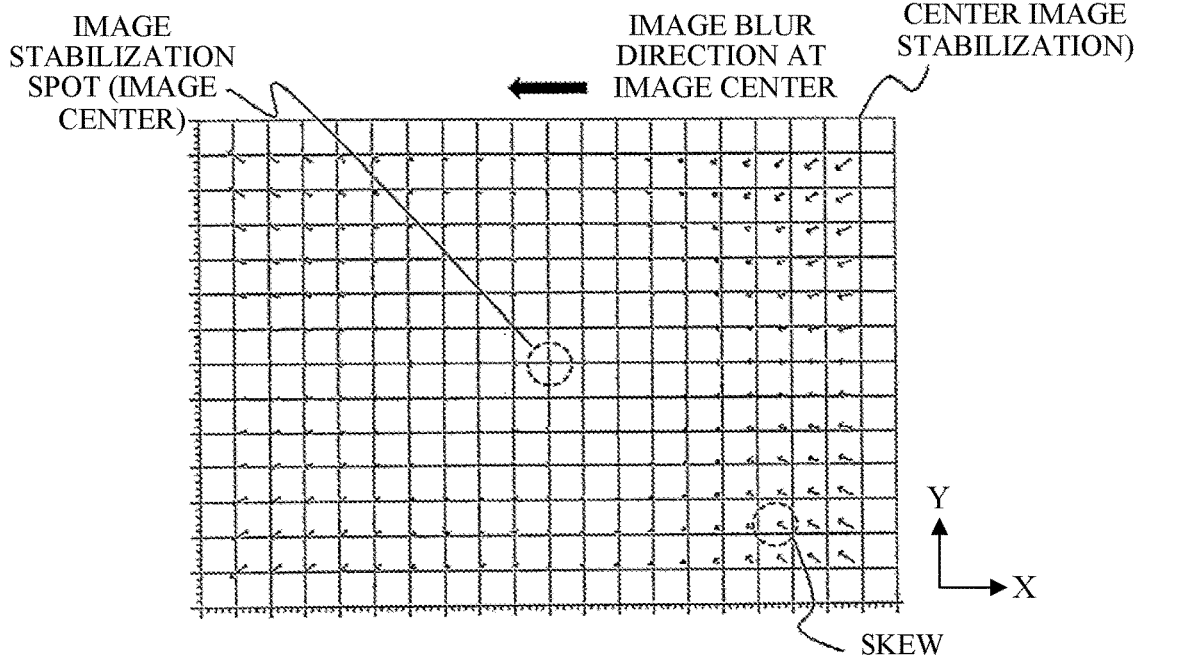
FIG. 18B illustrates a ratio and direction of an image-point moving amount of a correction residue generated at each image point when an image blur at the image center illustrated in FIG. 18A is corrected by a sensor shift type image stabilization mechanism by arrows.

FIGS. 17A to 17C are ray tracing diagrams in the optical system L0 according to Example 1 of a principal ray of the d-line corresponding to each angle of view incident from the object plane (a principal ray having a half angle of view 0 and a principal ray having a half angle of view ω). FIGS. 17A to 17C illustrate the stationary optical system L0, in a tilted state by a tilt angle $\omega_x$ about the X-axis using as a center an intersection between the image plane IP and the optical axis, and an eccentric state in which the OIS optical system is eccentric by an eccentric amount of y in the Y-axis direction.

The tilt-image shift sensitivity for each image height in the tilt direction (R direction) can be acquired by dividing by the tilt angle $\omega_x$ the image-point moving amount $\Delta y_{LSr}(h_r)$ as a difference of an imaging position on the image plane IP corresponding to each half angle of view between FIGS. 17A and 17B. The tilt-image shift sensitivity for each image height in the direction orthogonal to the tilt direction is acquired by using the image-point moving amount $\Delta y_{LS\theta}$ for each image height $h_\theta$ in the X-axis direction. The tilt-image shift sensitivity according to each example is acquired from the image-point moving amount in a case where the optical system L0 is tilted by 0.5°. The tilt angle $\omega_x$ has a positive sign in the counterclockwise direction and a negative sign in the clockwise direction in FIG. 17B. The image-point moving amount Δy has a positive sign in the upward direction and a negative sign in the downward direction.

The eccentric sensitivity of the OIS optical system for each image height in the eccentric direction (R direction) is acquired by dividing by the eccentricity y of the OIS optical system the image-point moving amount $\Delta y_{TSr}(h_r)$ as a difference of the imaging position on the image plane IP corresponding to each half angle of view between FIGS. 17A and 17C. In each example, the eccentric sensitivity of the OIS optical system for each image height in the direction orthogonal to the eccentric direction is acquired by using the image-point moving amount $\Delta y_{TS\theta}$ for each image height $h_\theta$ in the X-axis direction. The eccentric sensitivity data for the eccentricity of the OIS optical system in each example is acquired from the image-point moving amount in a case where the OIS optical system is eccentric by 0.1 mm.

Numerical Example 1

UNIT: mm

Surface Data

| Surface No. | r | d | nd | vd |
|---|---|---|---|---|
| 1 | 211.125 | 2.10 | 1.80810 | 22.8 |
| 2 | 80.660 | 6.03 | 1.77250 | 49.6 |
| 3 | 248.854 | 0.15 | | |
| 4 | 57.558 | 6.97 | 1.77250 | 49.6 |
| 5 | 160.440 | (Variable) | | |
| 6 | 66.217 | 1.40 | 1.88300 | 40.8 |
| 7 | 18.113 | 8.41 | | |
| 8 | −206.710 | 1.20 | 1.61800 | 63.4 |
| 9 | 22.688 | 4.36 | 1.85478 | 24.8 |
| 10 | 79.196 | 4.20 | | |
| 11 | −35.317 | 1.20 | 1.58313 | 59.4 |
| 12* | −312.513 | 0.43 | | |
| 13 | 910.041 | 5.47 | 1.59270 | 35.3 |
| 14 | −19.928 | 1.10 | 1.88300 | 40.8 |
| 15 | −47.138 | (Variable) | | |
| 16 (Diaphragm) | ∞ | 0.40 | | |
| 17 | 81.194 | 4.45 | 1.83481 | 42.7 |
| 18 | −54.244 | 0.15 | | |
| 19 | 41.217 | 7.25 | 1.49700 | 81.5 |
| 20 | −32.257 | 1.10 | 2.00069 | 25.5 |
| 21 | −293.896 | 2.41 | | |
| 22* | −71.464 | 1.75 | 1.76802 | 49.2 |
| 23 | 64.990 | 1.91 | 1.80810 | 22.8 |
| 24 | 199.742 | (Variable) | | |
| 25 | 30.855 | 6.56 | 1.59522 | 67.7 |
| 26 | −85.643 | 0.35 | | |
| 27 | 38.493 | 1.20 | 1.73800 | 32.3 |
| 28 | 22.868 | 7.83 | 1.53775 | 74.7 |
| 29 | −71.877 | 0.15 | | |
| 30* | −4310.465 | 1.70 | 1.85400 | 40.4 |
| 31* | 109.508 | (Variable) | | |
| 32 | 53.194 | 0.90 | 1.80400 | 46.6 |
| 33 | 22.891 | (Variable) | | |
| 34* | −42.821 | 1.70 | 1.58313 | 59.4 |
| 35* | −2156.781 | 0.15 | | |
| 36 | 344.261 | 3.20 | 2.00100 | 29.1 |
| 37 | −88.670 | (Variable) | | |
| Image Plane | ∞ | | | |

ASPHERIC DATA

12th Surface

K = 0.00000e+000 A 4 = −5.69442e−006 A 6 = −2.29053e−009
A 8 = −4.72363e−011 A10 = 4.65343e−013 A12 = −1.99227e−015
22nd Surface K = 0.00000e+000 A 4 = 1.87606e−006 A 6 = 1.45872e−009
A 8 = 2.78338e−011 A10 = −2.10980e−013 A12 = 3.98590e−016

-continued

UNIT: mm

30th Surface

K = 0.00000e+000 A 4 = −2.01869e−005 A 6 = 6.17344e−008
A 8 = −2.64177e−010 A10 = −2.98832e−013 A12 = 2.64092e−015
31st Surface K = 0.00000e+000 A 4 = 1.63774e−006 A 6 = 9.32838e−008
A 8 = −2.34772e−010 A10 = −7.39973e−013 A12 = 4.51086e−015
34th Surface K = 0.00000e+000 A 4 = −2.51719e−005 A 6 = 1.25180e−007
A 8 = −5.32709e−010 A10 = 5.08044e−013 A12 = 7.30860e−016
35th Surface K = 0.00000e+000 A 4 = −2.60571e−005 A 6 = 1.26402e−007
A 8 = −6.23562e−010 A10 = 1.45147e−012 A12 = −1.39940e−015

VARIOUS DATA
ZOOM RATIO 2.74

| | WIDE-ANGLE | MIDDLE | TELEPHOTO |
|---|---|---|---|
| Focal Length: | 24.72 | 43.76 | 67.66 |
| Fno: | 2.91 | 2.91 | 2.91 |
| Half Angle of View: | 42.00 | 25.95 | 17.34 |
| Image Height: | 21.64 | 21.64 | 21.64 |
| Overall Optical Length: | 144.33 | 158.18 | 172.04 |
| BF: | 14.30 | 25.72 | 35.98 |
| d 5 | 0.80 | 17.81 | 28.91 |
| d15 | 16.54 | 8.10 | 2.46 |
| d24 | 11.55 | 5.41 | 3.56 |
| d31 | 2.38 | 1.11 | 0.91 |
| d33 | 12.58 | 13.85 | 14.04 |
| d37 | 14.30 | 25.72 | 35.98 |

TILT-IMAGE SHIFT SENSITIVITY DATA FOR EACH IMAGE HEIGHT AT WIDE-ANGLE END IN TILT DIRECTION

| Half Angle of View $\omega$ [deg] | Image Height $h_r$ [mm] | Image-point Moving Amount $\Delta y_{LSr}$ [mm] after Blur of 0.5 deg | Tilt Image Shift Sensitivity $LS_r (h_r)$ [mm/deg] | Tilt-Image Shift Sensitivity Coefficient $k_{LS\_r}(h_r)$ |
|---|---|---|---|---|
| 0 | 0.000 | −0.216 | −0.431 | 1.000 |
| 6.9 | 3.000 | −0.218 | −0.435 | 1.009 |
| 13.7 | 6.000 | −0.224 | −0.448 | 1.038 |
| 20.3 | 9.000 | −0.235 | −0.471 | 1.091 |
| 26.4 | 12.000 | −0.254 | −0.507 | 1.176 |
| 32.6 | 15.001 | −0.281 | −0.562 | 1.303 |
| 37.6 | 18.001 | −0.322 | −0.645 | 1.494 |
| 41.2 | 21.000 | −0.385 | −0.770 | 1.784 |

TILT-IMAGE SHIFT SENSITIVITY DATA FOR EACH IMAGE HEIGHT AT WIDE-ANGLE END IN DIRECTION ORTHOGONAL TO TILT DIRECTION

| Half Angle of View $\omega$ [deg] | Image Height $h_\theta$ [mm] | Image-point Moving Amount $\Delta y_{LS\theta}$ [mm] after Blur of 0.5 deg | Tilt-Image Shift Sensitivity $LS_\theta (h_\theta)$ [mm/deg] | Tilt-Image Shift Sensitivity Coefficient $k_{LS\_\theta}(h_\theta)$ |
|---|---|---|---|---|
| 0 | 0.000 | −0.216 | −0.431 | 1.000 |
| 6.9 | 3.000 | −0.215 | −0.431 | 0.998 |
| 13.7 | 6.000 | −0.214 | −0.429 | 0.993 |
| 20.3 | 9.000 | −0.213 | −0.425 | 0.986 |
| 26.4 | 12.000 | −0.211 | −0.422 | 0.978 |

TILT-IMAGE SHIFT SENSITIVITY DATA FOR
EACH IMAGE HEIGHT AT WIDE-ANGLE END IN
DIRECTION ORTHOGONAL TO TILT DIRECTION

| Half Angle of View ω [deg] | Image Height $h_\theta$ [mm] | Image-point Moving Amount $\Delta y_{LS\theta}$ [mm] after Blur of 0.5 deg | Tilt-Image Shift Sensitivity $LS_\theta (h_\theta)$ [mm/deg] | Tilt-Image Shift Sensitivity Coefficient $k_{LS\_\theta}(h_\theta)$ |
|---|---|---|---|---|
| 32.0 | 15.001 | −0.209 | −0.419 | 0.971 |
| 37.0 | 18.001 | −0.209 | −0.418 | 0.968 |
| 41.2 | 21.000 | −0.209 | −0.419 | 0.971 |

ECCENTRIC SENSITIVITY DATA FOR EACH IMAGE HEIGHT
IN ECCENTRIC DIRECTION AGAINST ECCENTRICITY
OF OIS OPTICAL SYSTEM AT WIDE-ANGLE END

| Half Angle of View ω [deg] | Image Height $h_r$ [mm] | Image-point Moving Amount $\Delta y_{TSr}$ [mm] after Eccentricity of 0.1 mm | Eccentric Sensitivity $TS_r (h_r)$ [mm/mm] | Eccentric Sensitivity Coefficient $k_{TS\_r}(h_r)$ |
|---|---|---|---|---|
| 0 | 0.000 | −0.067 | −0.671 | 1.000 |
| 6.9 | 3.000 | −0.063 | −0.676 | 1.008 |
| 13.7 | 6.000 | −0.069 | −0.692 | 1.032 |
| 20.3 | 9.000 | −0.072 | −0.720 | 1.073 |
| 26.4 | 12.000 | −0.076 | −0.762 | 1.136 |
| 32.0 | 15.001 | −0.082 | −0.823 | 1.226 |
| 37.0 | 18.001 | −0.001 | −0.910 | 1.356 |
| 41.2 | 21.000 | −0.103 | −1.035 | 1.542 |

ECCENTRIC SENSITIVITY DATA FOR EACH IMAGE
HEIGHT IN DIRECTION ORTHOGONAL TO ECCENTRIC
DIRECTION AGAINST ECCENTRICITY OF OIS
OPTICAL SYSTEM AT WIDE-ANGLE END

| Half Angle of View ω [deg] | Image Height $h_\theta$ [mm] | Image-point Moving Amount $\Delta y_{TS\theta}$ [mm] after Eccentricity of 0.1 mm | Eccentric. Sensitivity $TS_\theta (h_\theta)$ [mm/mm] | Eccentric Sensitivity Coefficient $k_{TS\_\theta}(h_\theta)$ |
|---|---|---|---|---|
| 0 | 0.000 | −0.067 | −0.671 | 1.000 |
| 6.9 | 3.000 | −0.067 | −0.673 | 1.003 |
| 13.7 | 6.000 | −0.068 | −0.680 | 1.014 |
| 20.3 | 9.000 | −0.069 | −0.692 | 1.031 |
| 26.4 | 12.000 | −0.071 | −0.708 | 1.055 |
| 32.0 | 15.001 | −0.073 | −0.729 | 1.087 |
| 37.0 | 18.001 | −0.076 | −0.756 | 1.127 |
| 41.2 | 21.000 | −0.079 | −0.788 | 1.175 |

Numerical Example 2

UNIT: mm

Surface Data

| Surface No. | r | d | nd | νd |
|---|---|---|---|---|
| 1* | 3000.000 | 2.85 | 1.58313 | 59.4 |
| 2* | 16.526 | 10.57 | | |
| 3* | −809.327 | 2.25 | 1.85400 | 40.4 |
| 4* | 91.828 | 5.56 | | |
| 5 | −53.256 | 1.20 | 1.59522 | 67.7 |
| 6 | 68.528 | 0.15 | | |
| 7 | 43.587 | 5.03 | 1.85478 | 24.8 |
| 8 | −485.244 | (Variable) | | |
| 9 | 63.607 | 2.67 | 1.84666 | 23.9 |
| 10 | −1472.964 | 0.15 | | |
| 11 | 52.737 | 1.00 | 1.92286 | 20.9 |
| 12 | 22.996 | 5.41 | 1.53172 | 48.8 |
| 13 | 489.976 | (Variable) | | |
| 14 (Diaphragm) | ∞ | (Variable) | | |
| 15 | 27.733 | 1.20 | 2.00069 | 25.5 |
| 16 | 19.641 | 9.29 | 1.53775 | 74.7 |
| 17 | −78.882 | (Variable) | | |
| 18 | −67.558 | 4.31 | 1.92286 | 20.9 |
| 19 | −20.948 | 0.77 | 1.83400 | 37.2 |
| 20 | 136.126 | 3.52 | | |
| 21 | ∞ | (Variable) | | |
| 22 | 30.487 | 11.20 | 1.49700 | 81.6 |
| 23 | −50.182 | 0.15 | | |
| 24 | 40.928 | 11.00 | 1.49700 | 81.6 |
| 25 | −25.800 | 1.20 | 2.05090 | 26.9 |
| 26 | 208.835 | 4.54 | | |
| 27* | −73.669 | 2.10 | 1.85400 | 40.4 |
| 28* | −1000.000 | 0.15 | | |
| 29 | 216.036 | 3.40 | 1.92286 | 20.9 |
| 30 | −127.538 | (Variable) | | |
| Image Plane | ∞ | | | |

ASPHERIC DATA

1st Surface

K = 0.00000e+000 A 4 = 8.30213e−006 A 6 = −1.33976e−008
A 8 = 4.25008e−011 A10 = −8.60253e−014 A12 = 1.03363e−016

2nd Surface

K = −9.81344e−001 A 4 = 4.49709e−007 A 6 = −2.34544e−008
A 8 = −1.05516e−010 A10 = 8.07443e−013 A12 = −2.78552e−015

3rd Surface

K = 0.00000e+000 A 4 = −9.01759e−006 A 6 = −1.39642e−007
A 8 = 1.23272e−009 A10 = −3.49283e−012 A12 = 3.62808e−015

4th Surface

K = 0.00000e+000 A 4 = 6.34981e−006 A 6 = −1.29871e−007
A 8 = 1.67920e−009 A10 = −6.48374e−012 A12 = 1.50043e−014

27th Surface

K = 0.00000e+000 A 4 = −8.04129e−005 A 6 = 2.64851e−007
A 8 = −1.06038e−009 A10 = 4.87911e−012 A12 = −8.56493e−015

28th Surface

K = 0.00000e+000 A 4 = −6.00659e−005 A 6 = 2.67376e−007
A 8 = −7.05021e−010 A10 = 2.04492e−012 A12 = −2.97985e−015

VARIOUS DATA
ZOOM RATIO 2.20

| | WIDE-ANGLE | MIDDLE | TELEPHOTO |
|---|---|---|---|
| Focal Length: | 15.45 | 24.00 | 33.95 |
| Fno: | 2.91 | 2.91 | 2.91 |
| Half Angle of View: | 55.41 | 41.57 | 31.88 |
| Image Height: | 21.64 | 21.64 | 21.64 |
| Overall Optical Length: | 159.58 | 147.48 | 144.99 |
| BF: | 14.00 | 22.21 | 32.15 |
| d 8 | 25.32 | 7.72 | 1.50 |
| d13 | 8.24 | 11.30 | 7.40 |
| d14 | 13.71 | 5.42 | 0.71 |
| d17 | 1.60 | 9.89 | 14.61 |
| d21 | 7.04 | 1.27 | −1.05 |
| d30 | 14.00 | 22.21 | 32.15 |

TILT-IMAGE SHIFT SENSITIVITY DATA FOR EACH IMAGE HEIGHT AT WIDE-ANGLE END IN TILT DIRECTION

| Half Angle of View ω [deg] | Image Height $h_r$ [mm] | Image-point Moving Amount $\Delta y_{LSr}$ [mm] after Blur of 0.5 deg | Tilt-Image Shift Sensitivity $LS_r(h_r)$ [mm/deg] | Tilt-Image Shift Sensitivity Coefficient $k_{LS\_r}(h_r)$ |
|---|---|---|---|---|
| 0 | 0.000 | −0.135 | −0.270 | 1.000 |
| 11.0 | 3.000 | −0.139 | −0.278 | 1.030 |
| 21.4 | 6.000 | −0.152 | −0.303 | 1.124 |
| 30.6 | 9.001 | −0.174 | −0.348 | 1.291 |
| 38.5 | 12.002 | −0.208 | −0.415 | 1.540 |
| 45.0 | 15.002 | −0.253 | −0.505 | 1.873 |
| 50.3 | 18.000 | −0.311 | −0.621 | 2.304 |
| 54.6 | 21.000 | −0.388 | −0.776 | 2.878 |

TILT-IMAGE SHIFT SENSITIVITY DATA FOR EACH IMAGE HEIGHT AT WIDE-ANGLE END IN DIRECTION ORTHOGONAL TO TILT DIRECTION

| Half Angle of View ω [deg] | Image Height $h_\theta$ [mm] | Image-point Moving Amount $\Delta y_{LS\theta}$ [mm] after Blur of 0.5 deg | Tilt-Image Shift Sensitivity $LS_\theta(h_\theta)$ [mm/deg] | Tilt-Image Shift Sensitivity Coefficient $k_{LS\_\theta}(h_\theta)$ |
|---|---|---|---|---|
| 0 | 0.000 | −0.035 | −0.270 | 1.000 |
| 11.0 | 3.000 | −0.135 | −0.269 | 0.998 |
| 21.4 | 6.000 | −0.134 | −0.267 | 0.992 |
| 30.6 | 9.001 | −0.133 | −0.265 | 0.984 |
| 38.5 | 12.002 | −0.132 | −0.263 | 0.976 |
| 45.0 | 15.002 | −0.131 | −0.262 | 0.971 |
| 50.3 | 18.000 | −0.130 | −0.261 | 0.966 |
| 54.6 | 21.000 | −0.130 | −0.260 | 0.965 |

ECCENTRIC SENSITIVITY DATA FOR EACH IMAGE HEIGHT IN ECCENTRIC DIRECTION AGAINST ECCENTRICITY OF OIS OPTICAL SYSTEM AT WIDE-ANGLE END

| Half Angle of View ω [deg] | Image Height $h_r$ [mm] | Image-point Moving Amount $\Delta y_{TSr}$ [mm] after Eccentricity of 0.1 mm | Eccentric Sensitivity $TS_r(h_r)$ [mm/mm] | Eccentric Sensitivity Coefficient $k_{TS\_r}(h_r)$ |
|---|---|---|---|---|
| 0 | 0.000 | −0.066 | −0.665 | 1.000 |
| 11.0 | 3.000 | −0.067 | −0.671 | 1.009 |
| 21.4 | 6.000 | −0.069 | −0.687 | 1.034 |
| 30.6 | 9.001 | −0.072 | −0.717 | 1.078 |
| 38.5 | 12.002 | −0.076 | −0.760 | 1.144 |
| 45.0 | 15.002 | −0.083 | −0.826 | 1.243 |
| 50.3 | 18.000 | −0.093 | −0.927 | 1.395 |
| 54.6 | 21.000 | −0.107 | −1.073 | 1.615 |

ECCENTRIC SENSITIVITY DATA FOR EACH IMAGE HEIGHT IN DIRECTION ORTHOGONAL TO ECCENTRIC DIRECTION AGAINST ECCENTRICITY OF OIS OPTICAL SYSTEM AT WIDE-ANGLE END

| Half Angle of View ω [deg] | Image Height $h_\theta$ [mm] | Image-point Moving Amount $\Delta y_{TS\theta}$ [mm] after Eccentricity of 0.1 mm | Eccentric Sensitivity $TS_\theta(h_\theta)$ [mm/mm] | Eccentric Sensitivity Coefficient $k_{TS\_\theta}(h_\theta)$ |
|---|---|---|---|---|
| 0 | 0.000 | −0.066 | −0.665 | 1.000 |
| 11.0 | 3.000 | −0.067 | −0.657 | 1.004 |
| 21.4 | 6.000 | −0.068 | −0.675 | 1.016 |
| 30.6 | 9.000 | −0.069 | −0.688 | 1.035 |
| 38.5 | 12.000 | −0.071 | −0.705 | 1.061 |
| 45.0 | 15.001 | −0.073 | −0.729 | 1.097 |
| 50.3 | 18.001 | −0.076 | −0.759 | 1.142 |
| 54.6 | 21.000 | −0.080 | −0.795 | 1.197 |

Numerical Example 3

UNIT: mm
Surface Data

| Surface No. | r | d | nd | vd |
|---|---|---|---|---|
| 1 | 69.371 | 2.50 | 1.76385 | 48.5 |
| 2 | 14.745 | 14.38 | | |
| 3 | 263.184 | 1.35 | 1.53775 | 74.7 |
| 4 | 20.476 | 5.83 | | |
| 5 | −39.045 | 1.20 | 1.59282 | 68.6 |
| 6 | 33.526 | 0.24 | | |
| 7 | 26.797 | 6.12 | 1.85025 | 30.1 |
| 8 | −37.028 | (Variable) | | |
| 9 | −25.901 | 1.30 | 1.91082 | 35.3 |
| 10 | −122.028 | (Variable) | | |
| 11 | ∞ | 1.00 | | |
| 12 | 24.286 | 2.50 | 1.48749 | 70.2 |
| 13 | −95.780 | 0.20 | | |
| 14 | 20.038 | 1.00 | 1.95375 | 32.3 |
| 15 | 11.039 | 3.62 | 1.51742 | 52.4 |
| 16 | 231.303 | 2.50 | | |
| 17 (Diaphragm) | ∞ | 6.09 | | |
| 18 | 1764.677 | 0.90 | 1.67300 | 38.3 |
| 19 | 15.325 | 3.96 | 1.76385 | 48.5 |
| 20 | −112.119 | (Variable) | | |
| 21 | 53.370 | 3.77 | 1.43700 | 95.1 |
| 22 | −76.916 | 0.30 | | |
| 23 | −276.683 | 6.34 | 1.43700 | 95.1 |
| 24 | −16.095 | 1.20 | 1.88300 | 40.8 |
| 25 | −21.730 | 0.94 | | |
| 26 | −17.489 | 1.40 | 1.88300 | 40.8 |
| 27 | −24.438 | (Variable) | | |
| Image Plane | ∞ | | | |

VARIOUS DATA
ZOOM RATIO 1.86

| | WIDE-ANGLE | MIDDLE | TELEPHOTO |
|---|---|---|---|
| Focal Length: | 8.10 | 11.97 | 15.06 |
| Fno: | 4.10 | 4.10 | 4.10 |
| Half Angle of View: | 91.53 | 90.00 | 90.34 |
| Image Height: | 11.50 | 17.00 | 21.50 |
| Overall Optical Length: | 111.33 | 107.33 | 108.91 |
| BF: | 13.12 | 24.44 | 31.62 |
| d 8 | 3.88 | 3.84 | 3.41 |
| d10 | 17.92 | 6.25 | 1.70 |
| d20 | 7.77 | 4.16 | 3.54 |
| d27 | 13.12 | 24.44 | 31.62 |

TILT-IMAGE SHIFT SENSITIVITY DATA FOR EACH IMAGE
HEIGHT AT WIDE-ANGLE END IN TILT DIRECTION

| Half Angle of View $\omega$ [deg] | Image Height $h_r$ [mm] | Image-point Moving Amount $\Delta y_{LSr}$ [mm] after Blur of 0.5 deg | Tilt-image Shift Sensitivity $LS_r$ ($h_r$) [mm/deg] | Tilt-Image Shift Sensitivity Coefficient $k_{LS\_r}$ ($h_r$) |
|---|---|---|---|---|
| 0 | 0.000 | −0.071 | −0.141 | 1.000 |
| 10.6 | 1.500 | −0.070 | −0.141 | 0.994 |
| 21.4 | 3.000 | −0.069 | −0.138 | 0.977 |
| 32.3 | 4.500 | −0.067 | −0.134 | 0.951 |
| 43.7 | 6.000 | −0.065 | −0.130 | 0.917 |
| 55.5 | 7.500 | −0.062 | −0.124 | 0.875 |
| 68.0 | 9.000 | −0.058 | −0.115 | 0.816 |
| 81.6 | 10.502 | −0.052 | −0.104 | 0.734 |

TILT-IMAGE SHIFT SENSITIVITY DATA FOR
EACH IMAGE HEIGHT AT WIDE-ANGLE END IN
DIRECTION ORTHOGONAL TO TILT DIRECTION

| Half Angle of View $\omega$ [deg] | Image Height $h_\theta$ [mm] | Image-point Moving Amount $\Delta y_{LS\theta}$ [mm] after Blur of 0.5 deg | Tilt-Image Shift Sensitivity $LS_\theta$ ($h_\theta$) [mm/deg] | Tilt-Image Shift Sensitivity Coefficient $k_{LS\_\theta}$($h_\theta$) |
|---|---|---|---|---|
| 0 | 0.000 | −0.071 | −0.141 | 1.000 |
| 10.6 | 1.500 | −0.070 | −0.139 | 0.987 |
| 21.4 | 3.000 | −0.067 | −0.134 | 0.947 |
| 32.3 | 4.500 | −0.062 | −0.124 | 0.877 |
| 43.3 | 5.000 | −0.055 | −0.110 | 0.776 |
| 55.5 | 7.500 | −0.045 | −0.090 | 0.636 |
| 68.0 | 9.000 | −0.032 | −0.063 | 0.448 |
| 81.6 | 10.502 | −0.014 | −0.027 | 0.192 |

Numerical Example 4

UNIT: mm

Surface Data

| Surface No. | r | d | nd | vd |
|---|---|---|---|---|
| 1 | 50.658 | 1.57 | 1.48749 | 70.2 |
| 2 | 17.433 | 7.73 | | |
| 3 | 82.620 | 1.50 | 1.48749 | 70.2 |
| 4 | 22.068 | 13.94 | | |
| 5 | 28.055 | 5.75 | 1.90043 | 37.4 |
| 6 | −26.190 | 1.00 | 1.80000 | 29.8 |
| 7 | −678.364 | 6.06 | | |
| 8 (Diaphragm) | ∞ | 2.86 | | |
| 9 | 74.460 | 1.40 | 1.77250 | 49.6 |
| 10 | −3498.619 | 2.98 | | |
| 11 | −20.479 | 1.00 | 1.85478 | 24.8 |
| 12 | 30.759 | 3.15 | 1.49700 | 81.5 |
| 13 | −76.152 | 0.29 | | |
| 14 | 107.343 | 4.13 | 1.58313 | 59.4 |
| 15* | −42.035 | 0.15 | | |
| 16 | 108.394 | 4.96 | 1.85150 | 40.8 |
| 17 | −35.438 | (Variable) | | |
| 18 | −72.427 | 1.84 | 1.83481 | 42.7 |
| 19 | −45.108 | 10.50 | | |
| 20 | −23.819 | 1.57 | 1.51742 | 52.4 |
| 21 | −53.298 | 11.00 | | |
| Image Plane | ∞ | | | |

UNIT: mm

ASPHERIC DATA

15th Surface

K = 0.00000e+000 A 4 = 2.14904e−005 A 6 = −6.26885e−009
A 8 = 3.11936e−010 A10 = −1.96590e−012 A12 = 3.25155e−015

VARIOUS DATA

| Focal Length: | 20.60 |
|---|---|
| Fno: | 1.85 |
| Half Angle of View: | 46.42 |
| Image Height: | 18.71 |
| Overall Optical Length: | 84.88 |
| BF: | 11.00 |

| | INFINITY | CLOSE |
|---|---|---|
| d17 | 1.50 | 11.92 |

TILT-IMAGE SHIFT SENSITIVITY DATA
FOR EACH IMAGE HEIGHT IN IN-FOCUS
STATE AT INFINITY IN TILT DIRECTION

| Half Angle of View $\omega$ [deg] | Image Height $h_r$ [mm] | Image-point Moving Amount $\Delta y_{LSr}$ [mm] after Blur of 0.5 deg | Tilt-Image Shift Sensitivity $LS_r$ ($h_r$) [mm/deg] | Tilt-Image Shift Sensitivity Coefficient $k_{LS\_r}$ ($h_r$) |
|---|---|---|---|---|
| 0 | 0.000 | −0.180 | −0.359 | 1.000 |
| 8.3 | 2.988 | −0.181 | −0.362 | 1.007 |
| 16.2 | 5.906 | −0.186 | −0.371 | 1.033 |
| 23.6 | 8.699 | −0.194 | −0.388 | 1.078 |
| 30.2 | 11.333 | −0.205 | −0.409 | 1.138 |
| 36.1 | 13.796 | −0.217 | −0.435 | 1.209 |
| 41.2 | 16.111 | −0.234 | −0.468 | 1.302 |
| 45.6 | 18.283 | −0.254 | −0.509 | 1.416 |

TILT-IMAGE SHIFT SENSITIVITY DATA FOR EACH
IMAGE HEIGHT IN IN-FOCUS STATE AT INFINITY
IN DIRECTION ORTHOGONAL TO TILT DIRECTION

| Half Angle of View $\omega$ [deg] | Image Height $h_\theta$ [mm] | Image-point Moving Amount $\Delta y_{LS\theta}$ [mm] after Blur of 0.5 deg | Tilt-Image Shift Sensitivity $LS_\theta$ ($h_\theta$) [mm/deg] | Tilt-Image Shift Sensitivity Coefficient $k_{LS\_\theta}$($h_\theta$) |
|---|---|---|---|---|
| 0 | 0.000 | −0.180 | −0.360 | 1.000 |
| 8.3 | 2.988 | −0.179 | −0.358 | 0.996 |
| 16.2 | 5.906 | −0.177 | −0.354 | 0.984 |
| 23.6 | 8.699 | −0.174 | −0.347 | 0.966 |
| 30.2 | 11.333 | −0.170 | −0.339 | 0.944 |
| 36.1 | 13.796 | −0.165 | −0.331 | 0.919 |
| 41.2 | 16.111 | −0.161 | −0.321 | 0.894 |
| 45.6 | 18.283 | −0.156 | −0.313 | 0.869 |

ECCENTRIC SENSITIVITY DATA FOR EACH IMAGE HEIGHT IN ECCENTRIC DIRECTION AGAINST ECCENTRICITY OF OIS OPTICAL SYSTEM IN IN-FOCUS STATE AT INFINITY

| Half Angle of View ω [deg] | Image Height $h_r$ [mm] | Image-point Moving Amount $\Delta y_{TSr}$ [mm] after Eccentricity of 0.1 mm | Eccentric Sensitivity $TS_r(h_r)$ [mm/mm] | Eccentric Sensitivity Coefficient $k_{TS\_r}(h_r)$ |
|---|---|---|---|---|
| 0 | 0.000 | 0.030 | 0.299 | 1.000 |
| 8.3 | 2.988 | 0.030 | 0.302 | 1.010 |
| 16.2 | 5.906 | 0.031 | 0.311 | 1.040 |
| 23.6 | 8.699 | 0.033 | 0.325 | 1.087 |
| 30.2 | 11.333 | 0.034 | 0.344 | 1.149 |
| 36.1 | 13.796 | 0.037 | 0.366 | 1.223 |
| 41.2 | 16.111 | 0.039 | 0.390 | 1.305 |
| 45.6 | 18.283 | 0.042 | 0.416 | 1.392 |

ECCENTRIC SENSITIVITY DATA FOR EACH IMAGE HEIGHT IN DIRECTION ORTHOGONAL TO ECCENTRIC DIRECTION AGAINST ECCENTRICITY OF OIS OPTICAL SYSTEM IN IN-FOCUS STATE AT INFINITY

| Half Angle of View ω [deg] | Image Height $h_\theta$ [mm] | Image-point Moving Amount $\Delta y_{TS\theta}$ [mm] after Eccentricity of 0.1 mm | Eccentric Sensitivity $TS_\theta(h_\theta)$ [mm/mm] | Eccentric Sensitivity Coefficient $k_{TS\_\theta}(h_\theta)$ |
|---|---|---|---|---|
| 0 | 0.000 | 0.030 | 0.299 | 1.000 |
| 8.3 | 2.988 | 0.030 | 0.301 | 1.005 |
| 16.3 | 5.906 | 0.031 | 0.305 | 1.021 |
| 23.6 | 8.699 | 0.031 | 0.313 | 1.046 |
| 30.2 | 11.333 | 0.032 | 0.323 | 1.079 |
| 36.1 | 13.796 | 0.033 | 0.334 | 1.117 |
| 41.2 | 16.111 | 0.035 | 0.347 | 1.160 |
| 45.6 | 18.283 | 0.036 | 0.361 | 1.206 |

As described above, the configuration according to the present invention can easily and satisfactorily provide an image stabilization at a predetermined image point position including the center of the optical axis.

Each embodiment expresses the information on the image shift sensitivity to the tilt of the imaging optical system 101 according to the image point position as a correction coefficient table of the correction coefficient information in a matrix format defined by the image point position, but the present invention is not limited to this embodiment. It may be the tilt-image shift sensitivity $LS_r(h_r)$ or $LS_\theta(h_\theta)$ or the off-axis correction coefficient information acquired from the tilt-image shift sensitivity. That is, the information on the image shift sensitivity may be information that can provide a moving amount of a predetermined image point position to the tilt of the imaging optical system 101.

Each embodiment has described the tilt-image shift sensitivity as information for each image height in the direction (R direction) orthogonal to the tilt rotation axis of the imaging optical system 101 and in the direction parallel to the rotation axis of the tilt. However, the tilt-image shift sensitivity may be information determined for each image point position over the entire imaging plane against a predetermined tilt direction. In that case, it may be the tilt-image shift sensitivity directly acquired from the image-point moving amount over the entire imaging plane acquired using the designed value of the imaging optical system 101.

Each numerical example may acquire the image point position using the imaging position of the principal ray, but may acquire it using the peak position of MTF (Modulation Transfer Function).

The camera microcomputer 202 may perform image stabilization using an electronic image stabilization function that changes the effective pixel area of the image sensor 201. That is, the camera microcomputer 202 may function as one of the image stabilizers.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each of the above embodiments can provide a control apparatus, an image pickup apparatus, a lens apparatus, a control method, and a storage medium, each of which can easily and satisfactorily provide an image stabilization to a predetermined image point position including a center of an optical axis.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-033221, filed on Mar. 3, 2021, which is hereby incorporated by reference herein in its entirety.

What is claimed is:

1. A control apparatus comprising at least one processor or circuit configured to execute a plurality of tasks, including:
   a first acquiring task configured to acquire first information on an image shift sensitivity to a tilt of an imaging optical system corresponding to an image point position of the imaging optical system, the first information indicating an image point moving amount at an image plane of the imaging optical system caused by the tilt, and including an influence of a distortion of the imaging optical system; and
   a second acquiring task configured to acquire an image-stabilization driving amount that is used for an image stabilization by an image stabilizer configured to provide the image stabilization, wherein the second acquiring task acquires the image-stabilization driving amount corresponding to a predetermined image point position using the first information corresponding to the predetermined image point position, and wherein the image-stabilization driving amount corresponding to a first image point position is different from the image-stabilization driving amount corresponding to a second image point position, which is different from the first image point.

2. The control apparatus according to claim 1, wherein the first information is acquired using a designed value of the imaging optical system.

3. The control apparatus according to claim 1, wherein the first information provides information on a moving amount of the predetermined image point position to the tilt of the imaging optical system.

4. The control apparatus according to claim 1, wherein the first information determined for each position on the image plane.

5. The control apparatus according to claim 1, wherein the image-stabilization driving amount is acquired using second information on a blur and the first information.

6. The control apparatus according to claim 1, wherein the image-stabilization driving amount is acquired using information on a blur, information on the predetermined image point position, and the first information.

7. The control apparatus according to claim 5, wherein the second information includes information on angular velocities about a plurality of rotation axes.

8. The control apparatus according to claim 5, wherein the second information includes information on accelerations in a plurality of axial directions.

9. The control apparatus according to claim 1, wherein the predetermined image point position is on the image plane represented by a plurality of parameters.

10. The control apparatus according to claim 1, wherein the first information differs corresponding to a focal length of the imaging optical system.

11. The control apparatus according to claim 1, wherein the first information differs corresponding to an object distance to be focused.

12. The control apparatus according to claim 1, wherein the image stabilizer decenters an image sensor from an optical axis of the imaging optical system.

13. The control apparatus according to claim 1, wherein the image stabilizer changes an effective pixel area in an image sensor.

14. The control apparatus according to claim 1, wherein the image stabilizer decenters at least part of the imaging optical system from an optical axis of the imaging optical system.

15. An image pickup apparatus comprising:
an image sensor; and
a control apparatus including at least one processor or circuit configured to execute a plurality of tasks, including:
a first acquiring task configured to acquire first information on an image shift sensitivity to a tilt of an imaging optical system corresponding to an image point position of the imaging optical system, the first information indicating an image-point moving amount at an image plane of the imaging optical system caused by the tilt, and including an influence of a distortion of the imaging optical system; and
a second acquiring task configured to acquire an image-stabilization driving amount that is used for an image stabilization by an image stabilizer configured to provide the image stabilization,
wherein the second acquiring task acquires the image-stabilization driving amount corresponding to a predetermined image point position using the first information corresponding to the predetermined image point position, and
wherein the image-stabilization driving amount corresponding to a first image point position is different from the image-stabilization driving amount corresponding to a second image point position, which is different from the first image point.

16. The image pickup apparatus according to claim 15, further comprising a memory configured to store the first information.

17. A lens apparatus comprising:
an imaging optical system; and
a control apparatus including at least one processor or circuit configured to execute a plurality of tasks, including:
a first acquiring task configured to acquire first information on an image shift sensitivity to a tilt of the imaging optical system corresponding to an image point position of the imaging optical system, the first information indicating an image-point moving amount at an image plane of the imaging optical system caused by the tilt, and including an influence of a distortion of the imaging optical system; and
a second acquiring task configured to acquire an image-stabilization driving amount that is used for an image stabilization by an image stabilizer configured to provide the image stabilization,
wherein the second acquiring task acquires the image-stabilization driving amount corresponding to a predetermined image point position using the first information corresponding to the predetermined image point position, and
wherein the image-stabilization driving amount corresponding to a first image point position is different from the image-stabilization driving amount corresponding to a second image point position, which is different from the first image point.

18. The lens apparatus according to claim 17, further comprising a memory configured to store the first information.

19. A control method of acquiring an image-stabilization driving amount that is used for an image stabilization by an image stabilizer configured to provide the image stabilization, the control method comprising:
acquiring first information on an image shift sensitivity to a tilt of an imaging optical system corresponding to an image point position of the imaging optical system, the first information indicating an image-point moving amount at an image plane of the imaging optical system caused by the tilt, and including an influence of a distortion of the imaging optical system; and
acquiring an image-stabilization driving amount for the image stabilizer corresponding to a predetermined image point position using the first information corresponding to the predetermined image point position,
wherein the image-stabilization driving amount corresponding to a first image point position is different from the image-stabilization driving amount corresponding to a second image point position, which is different from the first image point.

20. A non-transitory storage medium storing a program executable by a computer to execute the control method according to claim 19.

\* \* \* \* \*